(12) United States Patent
Isahaya et al.

(10) Patent No.: US 9,546,249 B2
(45) Date of Patent: Jan. 17, 2017

(54) PROCESS FOR PREPARING HIGHLY POLYMERIZED AROMATIC POLYCARBONATE RESIN

(71) Applicant: MITSUBISHI GAS CHEMICAL COMPANY, INC., Tokyo (JP)

(72) Inventors: Yoshinori Isahaya, Ibaraki (JP); Atsushi Hirashima, Chiba (JP); Hidefumi Harada, Hyogo (JP); Maki Ito, Ibaraki (JP); Jun-ya Hayakawa, Chiba (JP); Takehiko Isobe, Chiba (JP); Taichi Tokutake, Tokyo (JP); Hongyu Liu, Tokyo (JP); Yousuke Shinkai, Chiba (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 76 days.

(21) Appl. No.: 14/442,911

(22) PCT Filed: Nov. 15, 2013

(86) PCT No.: PCT/JP2013/080846
§ 371 (c)(1),
(2) Date: May 14, 2015

(87) PCT Pub. No.: WO2014/077342
PCT Pub. Date: May 22, 2014

(65) Prior Publication Data
US 2015/0267006 A1  Sep. 24, 2015

(30) Foreign Application Priority Data
Nov. 17, 2012 (JP) ................. 2012-252797

(51) Int. Cl.
| | |
|---|---|
| *C08G 64/00* | (2006.01) |
| *C08J 3/00* | (2006.01) |
| *C08G 64/06* | (2006.01) |
| *C08G 64/30* | (2006.01) |
| *C08G 64/42* | (2006.01) |
| *C08G 63/02* | (2006.01) |

(52) U.S. Cl.
CPC .................. *C08J 3/00* (2013.01); *C08G 64/06* (2013.01); *C08G 64/307* (2013.01); *C08G 64/42* (2013.01); *C08J 2369/00* (2013.01); *Y02P 20/582* (2015.11)

(58) Field of Classification Search
CPC .................................. C08J 3/00; C08G 64/06
USPC .................... 528/196, 198; 525/54
See application file for complete search history.

(56) References Cited

U.S. PATENT DOCUMENTS

| | | | |
|---|---|---|---|
| 3,248,415 A * | 4/1966 | Stevens ................. | C08G 18/44 106/38.2 |
| 3,535,280 A | 10/1970 | Schnell et al. | |
| 5,521,275 A | 5/1996 | McCloskey et al. | |
| 5,696,222 A | 12/1997 | Kaneko et al. | |
| 5,847,189 A * | 12/1998 | Tojo ..................... | C07C 29/128 558/275 |
| 6,300,459 B1 | 10/2001 | Kaneko et al. | |
| 7,132,498 B2 | 11/2006 | McCloskey et al. | |
| 8,674,053 B2 | 3/2014 | Isahaya et al. | |
| 8,969,505 B2 | 3/2015 | Isahaya et al. | |
| 2013/0197166 A1* | 8/2013 | Isahaya ................. | C08G 64/42 525/462 |
| 2014/0206826 A1 | 7/2014 | Isahaya et al. | |
| 2015/0274887 A1* | 10/2015 | Isahaya ................. | C08G 64/04 525/462 |
| 2015/0322203 A1 | 11/2015 | Isahaya et al. | |

FOREIGN PATENT DOCUMENTS

| | | |
|---|---|---|
| EP | 0 595 608 | 5/1994 |
| EP | 1 657 272 | 5/2006 |
| EP | 1 363 962 | 11/2013 |
| JP | 50-19600 | 7/1975 |
| JP | 2/153923 | 6/1990 |
| JP | 6-94501 | 11/1994 |
| JP | 3271353 | 1/2002 |
| JP | 3301453 | 4/2002 |
| JP | 3317555 | 6/2002 |
| JP | 2005-97568 | 4/2005 |
| JP | 4112979 | 4/2008 |
| JP | 2008-514754 | 5/2008 |
| JP | 4286914 | 4/2009 |
| JP | 2009-102536 | 5/2009 |
| JP | 4691881 | 3/2011 |
| JP | 2011-127134 | 6/2011 |
| WO | 2011/062220 | 5/2011 |
| WO | 2012/108510 | 8/2012 |
| WO | 2012/157766 | 11/2012 |
| WO | 2014/077350 | 5/2014 |
| WO | 2014/077351 | 5/2014 |

OTHER PUBLICATIONS

Office Action in respect to U.S. Appl. No. 14/441,956 (published as US 2015/0322203), dated Dec. 11, 2015.

(Continued)

*Primary Examiner* — Terressa Boykin
(74) *Attorney, Agent, or Firm* — Greenblum & Bernstein, P.L.C.

(57) ABSTRACT

The present invention is to provide a process for preparing a highly polymerized aromatic polycarbonate resin, which comprises the steps of a highly polymerizing step for reacting an aromatic polycarbonate prepolymer and an aliphatic diol compound in the presence of a transesterification catalyst to obtain a highly polymerized aromatic polycarbonate resin, a cyclic carbonate removal step for removing at least part of the cyclic carbonate by-produced in the above highly polymerizing step out of the reaction system, and a recycle step of hydrolyzing the cyclic carbonate removed in the cyclic carbonate removal step to obtain an aliphatic diol compound and using the obtained aliphatic diol compound as at least a part of the aliphatic diol compound to be used in the highly polymerizing step.

15 Claims, 2 Drawing Sheets

(56) References Cited

OTHER PUBLICATIONS

Final Office Action in respect to U.S. Appl. No. 14/118,439 (published as US 2014/0206826 A1), dated Nov. 16, 2015.
International Search Report issued Feb. 4, 2014 in PCT/JP/013/080846.

* cited by examiner

DPC: Diphenylcarbonate
BPA: Bisphenol A
BEPG: 2-Butyl-2-ethyl-propane-1,3-diol

BEPO:

[- - - -]: Hydrolysis and purification are carried out by integrated apparatus (hydrolysis distillation)

[- - - -]: Hydrolysis and purification are carried out by integrated apparatus (hydrolysis distillation)

PROCESS FOR PREPARING HIGHLY POLYMERIZED AROMATIC POLYCARBONATE RESIN

TECHNICAL FIELD

The present invention relates to a process for preparing a highly polymerized polycarbonate resin by reacting an aromatic polycarbonate prepolymer and an aliphatic diol compound.

BACKGROUND ART

A polycarbonate is excellent in heat resistance, impact resistance and transparency, so that, in recent years, it has been widely used in many fields.

In a preparation process of the polycarbonate, many investigations have heretofore been done. Among these, a polycarbonate derived from an aromatic dihydroxy compound, for example, 2,2-bis(4-hydroxyphenyl)propane (hereinbelow, also referred to as "bisphenol A" or "BPA") has been industrially produced by any preparation processes of the interfacial polymerization method or the melt polymerization method.

According to the interfacial polymerization method, the polycarbonate is produced from bisphenol A and phosgene, but poisonous phosgene must be used. Also, there remain the problems that the apparatus is corroded by a chlorine-containing compound such as by-produced hydrogen chloride and sodium chloride, and methylene chloride used as the solvent with a large amount, etc., and that removal of the impurities such as sodium chloride, etc., and remaining methylene chloride which cause effects on the polymer physical property, is difficult.

On the other hand, as a method for preparing a polycarbonate from an aromatic dihydroxy compound and a diarylcarbonate, for example, it has been known a melt polymerization method from long ago in which bisphenol A and diphenylcarbonate are polymerized in a melt state by transesterification, while removing the by-produced aromatic monohydroxy compound. The melt polymerization method has merits that it does not use a solvent, etc., different from the interfacial polymerization method.

With regard to the melt polymerization method, various attempts have been investigated to solve the problems that the polymerization degree is difficultly raised, etc. (for example, see Patent Documents 1 to 13). However, according to these methods, it cannot be said that the tasks to accomplish higher polymerization while maintaining good qualities of the polycarbonate inherently possessed can be sufficiently solved.

The present inventors have previously found out a novel process, as a process for obtaining an aromatic polycarbonate which can accomplish a rapid polymerization rate and gives good quality, in which end-capped terminals of the aromatic polycarbonate is connected with an aliphatic diol compound to elongate the chain (for example, see Patent Document 14; WO 2011/062220A pamphlet). According to this process, an end-capped terminals of the aromatic polycarbonates are linked to the aliphatic diol compound to elongate the chain, whereby an aromatic polycarbonate resin with a high polymerization degree having an Mw of about 30,000 to 100,000 can be produced within a short period of time.

The present inventors have also previously proposed a preparation process of a highly polymerized polycarbonate resin comprising the steps of highly polymerizing an aromatic polycarbonate prepolymer by reacting with a linking agent which comprises an aliphatic diol compound having a specific structure in the presence of a transesterification catalyst, and also removing at least part of a cyclic carbonate by-produced in the highly polymerizing step out of the reaction system (for example, see Patent Document 15; WO 2012/157766 A pamphlet).

The method of highly polymerizing the polycarbonate by using the linking agent comprising an aliphatic diol compound has merits that a structural unit derived from the linking agent is scarcely remained in the main chain of the obtained highly polymerized polycarbonate resin, the obtained polycarbonate resin has the same skeletal structure as that of the conventional polycarbonate obtained by the interfacial method so that the polycarbonate resin having excellent physical properties as those of the conventional ones can be obtained.

In such a preparation process of the highly polymerized polycarbonate resin, it has been desired to develop an industrial preparation method which can use the starting materials with good efficiency by recycling these materials, but in the preparation process of the polycarbonate resin, some proposals concerning reuse of by-produced phenol, etc., have been merely done (for example, see Patent Documents 16 and 17).

PRIOR ART DOCUMENTS

Patent Documents

[Patent Document 1] JP S50-19600B
[Patent Document 2] JP H2-153923A
[Patent Document 3] U.S. Pat. No. 5,521,275B
[Patent Document 4] EP 0595608B1
[Patent Document 5] U.S. Pat. No. 5,696,222B
[Patent Document 6] JP Patent No. 4112979
[Patent Document 7] JP 2008-514754A
[Patent Document 8] JP Patent No. 4286914
[Patent Document 9] JP H6-94501B
[Patent Document 10] JP2009-102536A
[Patent Document 11] JP Patent No. 3271353
[Patent Document 12] JP Patent No. 3301453
[Patent Document 13] JP Patent No. 3317555
[Patent Document 14] WO 2011/062220A pamphlet
[Patent Document 15] WO 2012/157766A pamphlet
[Patent Document 16] JP 2011-127134A
[Patent Document 17] JP Patent No. 4691881

DISCLOSURE OF THE INVENTION

Problems to be Solved by the Invention

However, in the conventional preparation process of a higher molecular weight polycarbonate resin using a linking agent, it has not yet been proposed to reuse the linking agent.

An object to be solved by the present invention is to provide an improved preparation process which enables to reuse an aliphatic diol compound used as a linking agent with good efficiency in the preparation process of a highly polymerized aromatic polycarbonate resin.

Means to Solve the Problems

The present inventors have intensively studied and as a result found that the problems have been solved by the process in which an aromatic polycarbonate prepolymer and an aliphatic diol compound are reacted to highly polymerize these compounds and also at the time of removing a by-produced cyclic carbonate out of the reaction system, the removed cyclic carbonate is hydrolyzed to obtain an aliphatic diol compound, and the aliphatic diol compound is reused as at least a part of the aliphatic diol compound used in the highly polymerizing step, whereby the present invention has been accomplished.

That is, the present invention is to provide a process for preparing a highly polymerized aromatic polycarbonate resin composition shown below.

<1> A process for preparing a highly polymerized aromatic polycarbonate resin, which comprises the steps of a highly polymerizing step for reacting an aromatic polycarbonate prepolymer and an aliphatic diol compound represented by the following formula (g2) in the presence of a transesterification catalyst to obtain a highly polymerized aromatic polycarbonate resin, a cyclic carbonate removal step for removing at least part of the cyclic carbonate by-produced in the above highly polymerizing step out of the reaction system, and a recycle step for hydrolyzing the cyclic carbonate removed in the cyclic carbonate removal step to obtain an aliphatic diol compound and using the obtained aliphatic diol compound as at least a part of the aliphatic diol compound to be used in the highly polymerizing step.

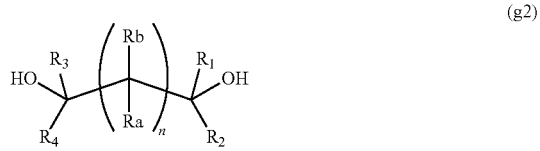

in the formula (g2), Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring; $R_1$ to $R_4$ each independently represent a hydrogen atom, a halogen atom or a linear or branched alkyl group having 1 to 5 carbon atoms; and n represents an integer of 0 to 30.

<2> The process for preparing according to the above <1>, wherein the cyclic carbonate removal step is a step of removing a distillate containing at least a part of the cyclic carbonate formed in the highly polymerizing step out of the reaction system.

<3> The process for preparing according to the above <2>, wherein the recycle step comprises a step of obtaining a hydrolysate solution by subjecting the distillate to hydrolysis treatment and a purification step of purifying the hydrolysate solution to separate an aliphatic diol compound.

<4> The process for preparing according to the above <3>, wherein the purification step comprises an oil-water separating step of separating the hydrolysate solution to an aqueous layer and an oil layer containing the aliphatic diol compound, and an oil layer purification step of purifying the oil layer to separate an aliphatic diol compound.

<5> The process for preparing according to the above <4>, wherein the oil-water separating step comprises a step of adding an acid or an alkali to the hydrolysate solution.

<6> The process for preparing according to the above <4> or <5>, wherein the oil-water separating step comprises a step of adding an organic solvent to the hydrolysate solution.

<7> The process for preparing according to any one of the above <4> to <6>, wherein the oil-water separating step comprises a step of heating the hydrolysate solution.

<8> The process for preparing according to any one of the above <3> to <7>, wherein the hydrolysis treatment is carried out by using 0.1 to 1.5-fold weight of alkali water based on an amount of the distillate.

<9> The process for preparing according to any one of the above <1> to <8>, wherein the aliphatic diol compound is a compound represented by the following formula (g3):

in the formula (g3), Ra and Rb each independently represent a hydrogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring.

<10> The process for preparing according to the above <9>, wherein the aliphatic diol compound is selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol and 2-methyl-2-propylpropane-1,3-diol.

<11> The process for preparing according to any one of the above <1> to <10>, wherein the cyclic carbonate is a compound represented by the following formula (h2):

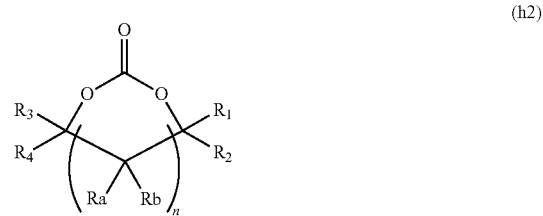

in the formula (h2), Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring; $R_1$ to $R_4$ each independently represent a hydrogen atom, a halogen atom or a linear or branched alkyl group having 1 to 5 carbon atoms; and n represents an integer of 0 to 30.

<12> The process for preparing according to the above <11>, wherein the cyclic carbonate is a compound represented by the following formula (h3):

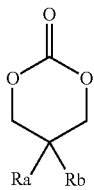

(h3)

in the formula (h3), Ra and Rb each independently represent a hydrogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring.

<13> The process for preparing according to any one of the above <1> to <12>, wherein an amount of the aliphatic diol compound to be used in the highly polymerizing step is 0.01 to 1.0 mol based on 1 mol of the total terminal amount of the aromatic polycarbonate prepolymer.

<14> The process for preparing according to any one of the above <1> to <13>, wherein the recycle step uses 50 to 100% by weight of the aliphatic diol compound obtained from the cyclic carbonate removed in the cyclic carbonate removal step as at least a part of an aliphatic diol compound to be used in the highly polymerizing step.

<15> The process for preparing according to any one of the above <1> to <14>, wherein the hydrolysis is an alkali hydrolysis.

<16> The process for preparing according to any one of the above <1> to <15>, wherein the hydrolysis is carried out at a temperature range of 25 to 120° C.

Effects of the Invention

According to the present invention, in the preparation process of the highly polymerized aromatic polycarbonate resin, an improved preparation process which can reuse an aliphatic diol compound used as a linking agent with good efficiency can be provided.

EMBODIMENTS TO CARRY OUT THE INVENTION

Figure 1:
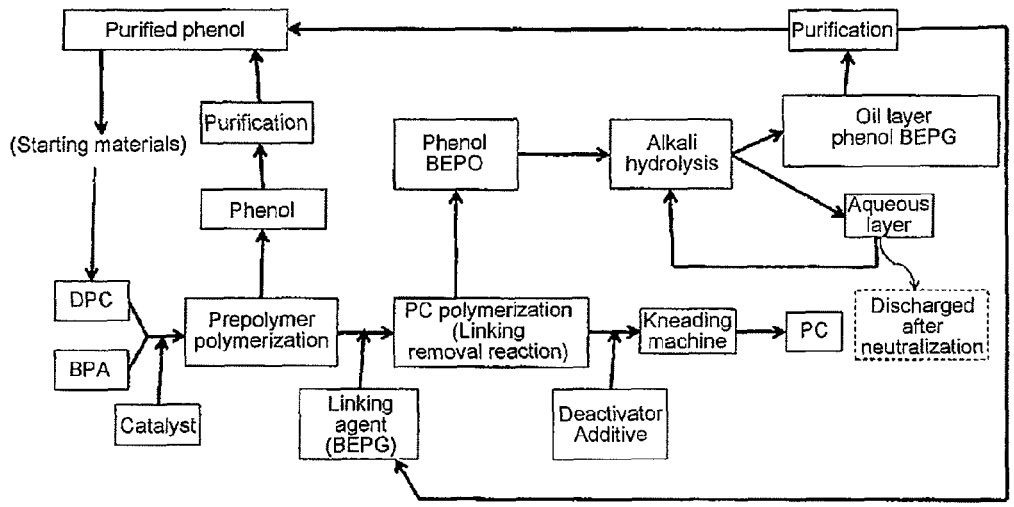
FIG. 1 is a flow chart of preparation steps showing an example of the preparation process of the present invention.
Figure 1:
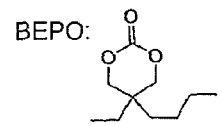

In the present specification, the term "step" includes not only the independent step, but also the step which can accomplish the intended purpose even when it cannot be clearly differentiated from the other steps. Also, the numerical range represented by using the term "to" shows the range that includes the numerical values described before and after the term "to" as the minimum value and the maximum value, respectively. Further, an amount of each component in the composition means, when a plural number of the corresponding substances are present in the composition, a total amount of a plural number of the corresponding substances, otherwise specifically mentioned.

The preparation process of the highly polymerized aromatic polycarbonate resin of the present invention comprises (1) a highly polymerizing step for reacting an aromatic polycarbonate prepolymer and an aliphatic diol compound represented by the following formula (g2) in the presence of a transesterification catalyst to highly polymerize, (2) a cyclic carbonate removal step for removing at least part of the cyclic carbonate by-produced in the above highly polymerizing step out of the reaction system, and (3) a recycle step for hydrolyzing the cyclic carbonate removed in the cyclic carbonate removal step to obtain an aliphatic diol compound and using the obtained aliphatic diol compound as at least a part of the aliphatic diol compound to be used in the highly polymerizing step.

The preparation process of the present invention is to further add a hydrolysis step to the preparation process of the polycarbonate resin by the melt polymerization method.

In the conventional preparation process of the high molecular weight polycarbonate resin which uses an aliphatic diol compound as a linking agent to link the aromatic polycarbonate prepolymer to a highly polymerized material, the linking agent i.e. the aliphatic diol compound was solely consumed in the step of polymerizing the polycarbonate. In the preparation process of the present invention, the linking agent is recovered and reused, i.e. recycled to that it can be used continuously without consumed.

In the higher polymerization method using a linking agent, when the melt polymerization method having many industrial merits as compared with the interfacial polymerization method is used, there is a merit that high quality polycarbonate resin products can be obtained with a high speed. According to the present invention, there are merits in addition to the above that the starting materials to be consumed are an aromatic dihydroxy compound and a carbonate diester alone, and a cost of the starting materials is not expensive as compared with the conventional melt polymerization method.

1. Highly Polymerizing Step

In the highly polymerizing step of the present invention, an aromatic polycarbonate prepolymer and an aliphatic diol compound are reacted in the presence of a transesterification catalyst to highly polymerize the product.

(1) Aromatic Polycarbonate Prepolymer

The aromatic polycarbonate prepolymer to be used in the process of the present invention is a polycondensed polymer i.e. aromatic polycarbonate prepolymer containing the structural unit represented by the following formula (II) as a main repeating unit. Here, the term "main" means a content of the structural unit represented by the formula (II) in the whole structural unit of the aromatic polycarbonate prepolymer is 60 mol % or more, preferably 80 mol % or more, more preferably 90 mol % or more.

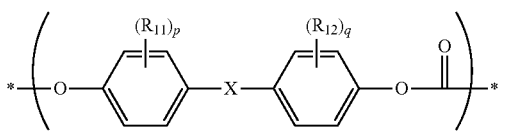

In the formula (II), $R_{11}$ and $R_{12}$ each independently represent a halogen atom, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms or an aryloxy group having 6 to 20 carbon atoms; p and q each represent an integer of 0 to 4; and X represents a single bond or a group selected from the group of the following (II').

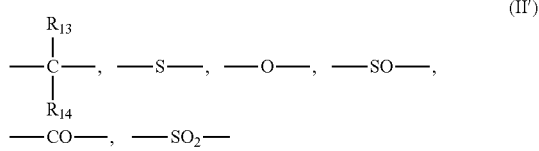

In the formula (II'), $R_{13}$ and $R_{14}$ each independently represent a hydrogen atom, an alkyl group having 1 to 10 carbon atoms or an aryl group having 6 to 10 carbon atoms, or $R_{13}$ and $R_{14}$ may be bonded to each other to form an aliphatic ring.

Such an aromatic polycarbonate prepolymer can be easily obtained either of the conventionally known transesterification method in which an aromatic dihydroxy compound to be led to the structural unit represented by the formula (II) is reacted with a carbonate diester in the presence of a basic catalyst i.e. transesterification catalyst, or the conventionally known interfacial polycondensation method in which the aromatic dihydroxy compound is reacted with phosgene in the presence of an acid binding agent.

The aromatic dihydroxy compound which derives the structural unit represented by the formula (II) may be mentioned the compound represented by the following formula (II").

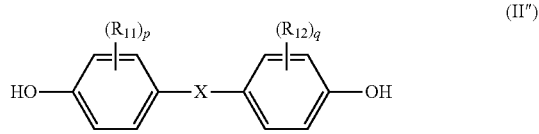

In the formula (II"), $R_{11}$, $R_{12}$, p, q and X each have the same meanings as $R_{11}$, $R_{12}$, p, q and X in the formula (II), respectively.

Such an aromatic dihydroxy compound may specifically include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 4,4'-dihydroxydiphenylether, 4,4'-dihydroxy-3,3'-dimethyldiphenylether, 4,4'-dihydroxydiphenylsulfide, 4,4'-dihydroxy-3,3'-dimethyldiphenylsulfide, 4,4'-dihydroxydiphenylsulfoxide, 4,4'-dihydroxy-3,3'-dimethyldiphenylsulfoxide, 4,4'-dihydroxydiphenylsulfone, 4,4'-dihydroxydiphenylsulfone, 4,4'-dihydroxy-3,3'-dimethyldiphenylsulfone, etc.

Among these, 2,2-bis(4-hydroxyphenyl)propane, i.e. BPA is mentioned as the preferred one in the points of stability as a monomer, and further a material containing less impurity is easily available, etc.

In the present invention, for the purpose of control of the glass transition temperature, improvement in fluidity, improvement in a refractive index, reduction in double refraction, etc., control of optical properties, etc., a plural kinds of the various monomers, i.e. aromatic dihydroxy compounds may be used in combination.

The aromatic polycarbonate prepolymer to be used in the present invention may be a material synthesized by the interfacial polymerization method or a material synthesized by the melt polymerization method, or may be a material synthesized by the method of the solid phase polymerization method or the thin film polymerization method, etc. It is also possible to use a polycarbonate recovered from used products such as used disk molded product, etc. These polycarbonates may be mixed and utilized as an aromatic polycarbonate prepolymer before the reaction without any problem. For example, the polycarbonate polymerized by the interfacial polymerization method and the polycarbonate polymerized by the melt polymerization method may be mixed, and, the polycarbonate polymerized by the melt polymerization method or the interfacial polymerization method and the polycarbonate recovered from the used disk molded product, etc., may be mixed and used without any problem.

The aromatic polycarbonate prepolymer to be used in the present invention may preferably include a terminal end-capped aromatic polycarbonate prepolymer which satisfies a specific condition(s).

That is, the aromatic polycarbonate prepolymer is preferably at least part of which is end-capped by a terminal group derived from the aromatic monohydroxy compound or a phenyl terminal group which is a phenyloxy group or a phenyloxycarbonyl group (hereinbelow, also referred to "end-capped terminal group" together) derived from the aromatic monohydroxy compound.

When a ratio of the end-capped terminal group is 60 mol % or more based on the whole terminal amount, the effect is particularly remarkable, preferably 90 mol % or more, more preferably 95 mol % or more. Also, a end-capped terminal group concentration (a ratio of the end-capped terminal group based on the whole constitutional units) is 2 mol % or more, preferably 2 to 20 mol %, particularly preferably 2 to 12 mol %. If the end-capped terminal group concentration is 2 mol % or more, the reaction with the aliphatic diol compound rapidly proceeds, and the effects specific in the present invention are particularly markedly shown. A ratio of the end-capped terminal amount of the aromatic polycarbonate prepolymer based on the whole terminal amount of the polymer can be analyzed by the $^1$H-NMR analysis of the aromatic polycarbonate prepolymer. Also, the end-capped terminal group concentration may be analyzed by a pyrolysis gas chromatography.

Also, the terminal hydroxyl group concentration in the aromatic polycarbonate prepolymer can be measured by spectrometry with a Ti complex or by a $^1$H-NMR analysis. The terminal hydroxyl group concentration means a ratio of a terminal amount of the hydroxyl group based on the whole amount of the constitutional units. The terminal hydroxyl group concentration by the $^1$H-NMR analysis is preferably 1,500 ppm or less, further preferably 1,000 ppm or less is suitable. If the terminal hydroxyl group concentration is within the range or the end-capped terminal group concentration is in the range corresponding to the above, there is a tendency that sufficiently highly polymerizing effects can be obtained by the transesterification with the aliphatic diol compound.

The "whole terminal group amount of the polycarbonate" or "whole terminal group amount of the aromatic polycarbonate prepolymer" herein mentioned is calculated, for example, when there is 0.5 mol of branch-less polycarbonate (that is, a linear polymer), the whole terminal group amount is calculated to be 1 mol.

Specific examples of the end-capped terminal group may include terminal groups such as a phenyl terminal, i.e. a phenyloxy group or a phenyloxycarbonyl group, a cresyl terminal, an o-tolyl terminal, a p-tolyl terminal, a p-t-butylphenyl terminal, a biphenyl terminal, an o-methoxycarbonylphenyl terminal, a p-cumylphenyl terminal, etc.

Among these, terminal groups constituted by an aromatic monohydroxy compound having a low boiling point which is easily removed from the reaction system of the transesterification with the aliphatic diol compound are preferred, and a phenyl terminal, a p-tert-butylphenyl terminal, etc., are particularly preferred.

Such a end-capped terminal group can be introduced in the interfacial method by using a terminating agent at the time of preparing the aromatic polycarbonate prepolymer. Specific examples of the terminating agent may include p-tert-butylphenol, phenol, p-cumylphenol, a long chain alkyl-substituted phenol, etc. An amount of the terminating agent to be used can be optionally determined depending on a terminal amount of the desired aromatic polycarbonate prepolymer, that is, the molecular weight of the desired aromatic polycarbonate prepolymer, a reaction apparatus, reaction conditions, etc.

In the melting method, at the time of preparing an aromatic polycarbonate prepolymer, a end-capped terminal group can be introduced by excessively using a carbonate diester such as diphenylcarbonate to an aromatic dihydroxy compound. Whereas it depends on an apparatus to be used for the reaction and reaction conditions, the carbonate diester is specifically used in an amount of 1.00 to 1.30 mol, more preferably 1.02 to 1.20 mol based on 1 mol of the aromatic dihydroxy compound. According to this procedure, an aromatic polycarbonate prepolymer satisfying the terminal end-capped amount can be obtained.

In the present invention, as the aromatic polycarbonate prepolymer, a terminal end-capped polycondensation polymer obtained by reacting, i.e. transesterification the aromatic dihydroxy compound with the carbonate diester is preferably used.

When the aromatic polycarbonate prepolymer is to be prepared, in combination with the aromatic dihydroxy compound, a polyfunctional compound having 3 or more functional groups in the molecule may be used. Such a polyfunctional compound preferably used may include a compound having a reactive functional group such as phenolic hydroxyl group, a carboxyl group, etc.

Further, when the aromatic polycarbonate prepolymer is to be prepared, in combination with the aromatic dihydroxy compound, a dicarboxylic acid compound may be used to prepare a polyester carbonate. The dicarboxylic acid compound may be preferably terephthalic acid, isophthalic acid, naphthalenedicarboxylic acid, 1,4-cyclohexanedicarboxylic acid, etc., and these dicarboxylic acids are preferably employed to use as an acid chloride or an ester compound. Also, at the time of preparing a polyester carbonate resin, the dicarboxylic acid is preferably used in the range of 0.5 to 45 mol %, more preferably in the range of 1 to 40 mol % based on the total of the dihydroxy component (aromatic dihydroxy compound) and the dicarboxylic acid component is made as 100 mol %.

A molecular weight of the aromatic polycarbonate prepolymer is desirably a weight average molecular weight (Mw) of 5,000 to 60,000. It is more preferably an aromatic polycarbonate prepolymer with an Mw in the range of 10,000 to 50,000, further preferably 10,000 to 40,000, particularly preferably 15,000 to 35,000.

If the aromatic polycarbonate prepolymer having a high molecular weight exceeding the above range is used, the aromatic polycarbonate prepolymer itself is high viscosity, so that preparation of the prepolymer is required to be carried out at high temperature, high shearing for a long period of time, and/or the reaction with the aliphatic diol compound may be required to be carried out at high temperature, high shearing for a long period of time.

(2) Aliphatic Diol Compound

An aliphatic diol compound means a dialcohol compound having two alcoholic hydroxy groups which each bind to a non-aromatic carbon atom. The aliphatic diol compound includes a compound having aromatic ring moiety in the molecular structure but does not include a phenolic compound having a hydroxy group binding to an aromatic ring.

The aliphatic diol compound to be used in the process of the present invention is represented by the following formula (g2).

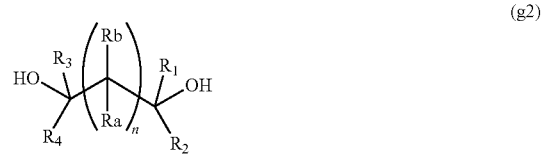

(g2)

In the formula (g2), Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring; The halogen atom is preferably a fluorine atom.

$R_1$ to $R_4$ each independently represent a hydrogen atom, a halogen atom or a linear or branched alkyl group having 1 to 5 carbon atoms; and the halogen atom is preferably a fluorine atom.

n represents an integer of 0 to 30, preferably 1 to 6, more preferably 1 to 3, particularly preferably 1.

In the formula (g2), Ra and Rb are each preferably and independently a hydrogen atom, a halogen atom, a linear or branched alkyl group having 1 to 8 carbon atoms, a cycloalkyl group having 3 to 8 carbon atoms, an aryl group having 6 to 10 carbon atoms, or an alkoxy group having 1 to 8 carbon atoms, or Ra and Rb may be bonded to each other to form an alicyclic ring having 3 to 8 carbon atoms. The halogen atom is preferably a fluorine atom.

$R_1$ to $R_4$ each preferably and independently represent a hydrogen atom, a fluorine atom or a methyl group.

n preferably represents an integer of 1 to 6.

In the formula (g2), Ra and Rb are each more preferably and independently a hydrogen atom or a linear or branched alkyl group having 1 to 5 carbon atoms, further preferably a linear or branched alkyl group having 1 to 4 carbon atoms. Preferred examples may include a methyl group, an ethyl group, a propyl group, an n-butyl group, an isobutyl group and an isopentyl group, etc., and more preferred examples may include a methyl group, an ethyl group, a propyl group, an n-butyl group and an isobutyl group. $R_1$ to $R_4$ are each more preferably a hydrogen atom. n is more preferably an integer of 1 to 3.

The aliphatic diol compound represented by the formula (g2) is more preferably a compound represented by the following formula (g3). In the formula (g3), Ra and Rb are the same as Ra and Rb in the formula (g2), respectively.

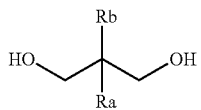

(g3)

In the formula (g3), Ra and Rb are more preferably each independently a hydrogen atom or a linear or branched alkyl group having 1 to 5 carbon atoms, more preferably a linear or branched alkyl group having 1 to 4 carbon atoms, further preferably a linear or branched alkyl group having 2 to 4 carbon atoms. Preferred specific examples may include a methyl group, an ethyl group, a propyl group, an n-butyl group, an isobutyl group and an isopentyl group, etc., more preferably an ethyl group, a propyl group, an n-butyl group, and an isobutyl group.

The aliphatic diol compound represented by the formula (g2) may include 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, propane-1,2-diol, propane-1,3-diol, ethane-1,2-diol (i.e. 1,2-ethylene glycol), 2,2-diisoamylpropane-1,3-diol, and 2-methylpropane-1,3-diol.

Also, other examples of the aliphatic diol compound may include the compounds having the following structural formulae.

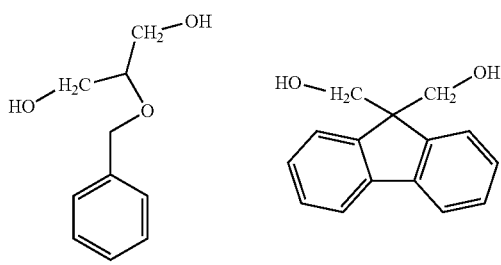

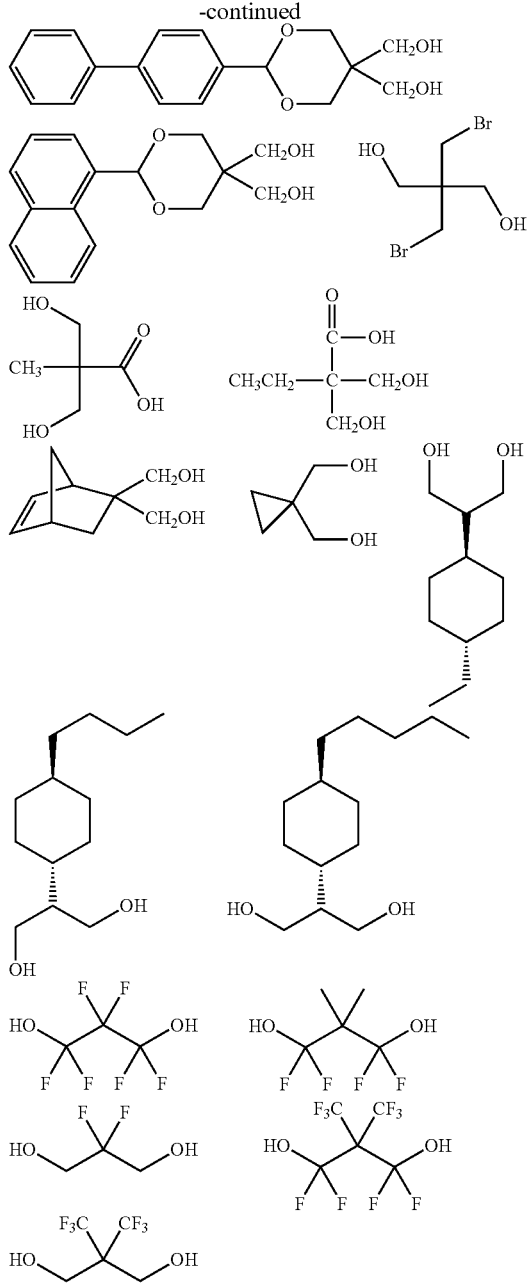

Among these, particularly preferred is a compound selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol and 2-methyl-2-propylpropane-1,3-diol.

(3) Chemical Purity

Chemical purities of the starting compounds such as the aromatic dihydroxy compound, the aliphatic diol compound and the carbonate bond formable compound to be used in the preparation process of the present invention are each preferably a highly purified material. It is possible to prepare the product by a commercially available product or with the chemical purity of an industrial level, but when low purity materials are used, the resulting product contains a by-produced product derived from the impurities or a heterologous skeletal structure, so that the resulting resin and the molded product are colored remarkably, various physical properties such as thermal stability and strength, etc., are lowered, whereby it may become difficult to maintain the physical properties inherently possessed by the polycarbonate resin.

Preferred chemical purity of the aliphatic diol compound is 70% or more, more preferably 80% or more, and particularly preferably 90% or more. Preferred chemical purity of the carbonate bond formable compound such as diphenylcarbonate, etc., is 80% or more, more preferably 90% or more, and particularly preferably 95% or more. Preferred chemical purity of the aromatic dihydroxy compound is 90% or more, more preferably 95% or more, and particularly preferably 99% or more.

Also, in the starting compounds, in addition to impurities which lower the chemical purity, chlorine, nitrogen, boron, an alkali metal, an alkaline earth metal, a light metal and a heavy metal, etc., may be contained as impurities, and the chlorine amount, the nitrogen amount, the boron amount, the alkali metal amount, the alkaline earth metal amount, the light metal amount and the heavy metal amount contained in the starting compounds are preferably as low as possible.

Examples of the alkali metal may include lithium, sodium, potassium, rubidium, cesium and a salt or a derivative thereof. The alkaline earth metal may include beryllium, magnesium, calcium, strontium, barium and a salt or a derivative thereof. Examples of the light metal may include titanium, aluminum and a salt or a derivative thereof.

Specific examples of the heavy metal may include vanadium, chromium, manganese, iron, cobalt, nickel, copper, zinc, gallium, germanium, niobium, molybdenum, ruthenium, rhodium, palladium, silver, cadmium, indium, tin, antimony, tantalum, tungsten, osmium, iridium, platinum, gold, thallium, lead, bismuth, arsenic, selenium, tellurium and a salt or a derivative thereof.

These impurities are preferably as low as possible in all the starting materials.

A content of the impurities contained in the aliphatic diol compound is, as the chlorine, for example, it is 3 ppm or less, preferably 2 ppm or less, more preferably 1 ppm or less. As the nitrogen, it is, for example, 100 ppm or less. As the alkali metal, alkaline earth metal, titanium and heavy metal (among these, iron, nickel, chromium, zinc, copper, manganese, cobalt, molybdenum, tin), these amounts are 10 ppm or less, preferably 5 ppm, more preferably 1 ppm or less.

A content of the impurities contained in the other starting materials (aromatic dihydroxy compound and carbonate bond formable compound) is, as the chlorine, for example, it is 2 ppm or less, preferably 1 ppm or less, more preferably 0.8 ppm or less. As the nitrogen, it is, for example, 100 ppm or less. The alkali metal, alkaline earth metal, titanium and heavy metal (among these, iron, nickel, chromium, zinc, copper, manganese, cobalt, molybdenum, tin), these amounts are, for example, 10 ppm or less, preferably 5 ppm, more preferably 1 ppm or less.

When a migrated amount of the metal components is much, the reaction becomes more rapid by the catalytic action or the reactivity becomes worse contrarily. As a result, progress of the assumed reaction is inhibited and a side reaction may proceed, whereby a ratio of the spontaneously generating branched chain structure is increased or an N value (structural viscosity index) unexpectedly increases in some case. Moreover, coloring of the resulting resin and molded product becomes remarkable, or various physical properties such as thermal stability, etc., may be lowered.

Also, by using starting materials having high purities, a color tone or a molecular weight retaining ratio (an index showing how lowering in a molecular weight can be suppressed when heat detention is applied under high temperatures) can be further improved.

(4) Preparation Process

Hereinbelow, detailed conditions of the preparation process of the present invention are explained.

(i) Addition of Aliphatic Diol Compound

In the preparation process of the present invention, to the aromatic polycarbonate prepolymer is added the aliphatic diol compound and mixed, and highly polymerizing reaction (transesterification) is carried out in a highly polymerizing reactor.

An amount of the aliphatic diol compound to be used is preferably 0.01 to 1.0 mol based on 1 mol of the whole terminal group amount of the aromatic polycarbonate prepolymer, more preferably 0.1 to 1.0 mol, further preferably 0.2 to 0.7 mol. However, when a material having a relatively low boiling point (for example, a boiling point of less than about 350° C.) is used as the aliphatic diol compound, such a material may be added with an excessive amount in consideration with the possibility that a part of which is passed through the reaction system without participating in the reaction by volatilization, etc., depending on the reaction conditions. For example, it may be added with the maximum amount of 50 mol, preferably 10 mol, more preferably 5 mol based on 1 mol of the whole terminal group amount of the aromatic polycarbonate prepolymer.

A method of adding and mixing the aliphatic diol compound is not particularly limited, and when a material having a relatively high boiling point (boiling point: about 350° C. or higher) is used as the aliphatic diol compound, the aliphatic diol compound is preferably directly supplied to a highly polymerizing reactor under higher vacuum conditions with a pressure reduction degree of 10 torr (1333 Pa or lower) or lower. It is more preferably a pressure reduction degree of 2.0 torr or lower (267 Pa or lower), more preferably 0.01 to 1.0 torr (1.3 to 133 Pa or lower). If the pressure reduction degree at the time of supplying the aliphatic diol compound to the highly polymerizing reactor is insufficient, a cleavage reaction of the prepolymer main chain due to the by-product (for example, phenol) proceeds, and there is a case where the reaction time of the reaction mixture cannot help making longer for higher polymerization.

On the other hand, when a material having a relatively low boiling point (boiling point: less than about 350° C. or lower) is used as the aliphatic diol compound, the aromatic polycarbonate prepolymer and the aliphatic diol compound can be mixed under a relatively gentle pressure reduction degree. For example, the aromatic polycarbonate prepolymer and the aliphatic diol compound are mixed at a pressure near to the normal pressure to prepare a prepolymer mixture, then, the prepolymer mixture is supplied to a highly polymerizing reaction under reduced pressure conditions, so that even when it is an aliphatic diol compound having a relatively low boiling point, volatilization can be restrained at the minimum degree and it is not necessary to use the compound excessively.

(ii) Transesterification (Highly Polymerizing Reaction)

A temperature to be used for transesterification (highly polymerizing reaction) of the aromatic polycarbonate prepolymer and the aliphatic diol compound is preferably in the range of 240° C. to 320° C., further preferably 260° C. to 310° C., more preferably 270° C. to 300° C.

Also, the pressure reduction degree is preferably 13 kPa (100 torr) or lower, more preferably 1.3 kPa (10 torr) or lower, further preferably 0.013 to 0.67 kPa (0.1 to 5 torr).

Examples of the transesterification catalyst to be used in the present transesterification may include a basic compound catalyst. Examples of the basic compound catalyst may include an alkali metal compound and/or an alkaline earth metal compound, a nitrogen-containing compound, etc.

Such a compound preferably used may include an organic acid salt, an inorganic salt, an oxide, a hydroxide, a hydride or an alkoxide of an alkali metal and alkaline earth metal, etc.; a quaternary ammonium hydroxide and a salt thereof; and amines, etc., and these compounds may be used alone or two or more in combination.

Specific examples of the alkali metal compound used may include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium tetraphenylborate, sodium benzoate, potassium benzoate, cesium benzoate, lithium benzoate, disodium hydrogen phosphate, dipotassium hydrogen phosphate, dilithium hydrogen phosphate, disodium phenyl phosphate, sodium gluconate, disodium salt, dipotassium salt, dicesium salt or dilithium salt of bisphenol A, sodium salt, potassium salt, cesium salt or lithium salt of phenol, etc. Among these, the alkali metal compound is preferably sodium hydrogen carbonate, sodium carbonate, potassium carbonate, cesium carbonate, etc.

The alkaline earth metal compound specifically used may include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, etc.

Specific examples of the nitrogen-containing compound to be used may include quaternary ammonium hydroxides having an alkyl group and/or an aryl group such as tetramethylammonium hydroxide, tetraethylammonium hydroxide, tetrapropyl-ammonium hydroxide, tetrabutylammonium hydroxide, trimethylbenzylammonium hydroxide, etc., tertiary amines such as triethylamine, dimethylbenzylamine, triphenylamine, etc., secondary amines such as diethylamine, dibutylamine, etc., primary amines such as propylamine, butylamine, etc., imidazoles such as 2-methylimidazole, 2-phenylimidazole, benzoimidazole, etc., or bases or basic salts such as ammonia, tetramethylammonium borohydride, tetrabutylammonium borohydride, tetrabutylammonium tetraphenylborate, tetraphenylammonium tetraphenylborate, etc. Among these, the nitrogen-containing compound is preferably tetramethylammonium hydroxide, etc.

The transesterification catalyst also preferably used is a salt of zinc, tin, zirconium, or lead, and these may be used singly or in combination of two or more.

Specific examples of the transesterification catalyst may include zinc acetate, zinc benzoate, zinc 2-ethylhexanoate, tin(II) chloride, tin(IV) chloride, tin(II) acetate, tin(IV) acetate, dibutyl tin dilaurate, dibutyl tin oxide, dibutyl tin dimethoxide, zirconium acetylacetonate, zirconium oxyacetate, zirconium tetrabutoxide, lead(II) acetate, lead(IV) acetate, etc.

These transesterification catalysts are used with a ratio of $1 \times 10^{-9}$ to $1 \times 10^{-3}$ mol, preferably a ratio of $1 \times 10^{-7}$ to $1 \times 10^{-5}$ mol based on 1 mol of the total aromatic dihydroxy compound.

Incidentally, in the case of the steps in which the product is prepared continuously from the step of preparing the aromatic polycarbonate prepolymer by the reaction of an aromatic dihydroxy compound and a carbonate diester which are starting materials, the transesterification catalyst to be used in the highly polymerizing step may be that used in preparing the aromatic polycarbonate prepolymer and is used as such.

(iii) Other Preparation Conditions

In the present invention, according to the transesterification of the aromatic polycarbonate prepolymer and the aliphatic diol compound, it is preferred to heighten the weight average molecular weight (Mw) of the aromatic polycarbonate resin after the reaction 5,000 or more than the weight average molecular weight (Mw) of the aromatic polycarbonate prepolymer, more preferably to heighten 10,000 or more, further preferably 15,000 or more.

A kind of the apparatus or a material of the reaction vessel to be used for the transesterification with the aliphatic diol compound may be used any conventionally known material, and the reaction may be carried out either by the continuous system or the batch system. The reaction apparatus to be used for carrying out the reaction may be a vertical type equipped with an anchor mixing impeller, Maxblend® mixing impeller, helical ribbon type mixing impeller, etc., a horizontal type equipped with a paddle blade, lattice blade, spectacle-shaped blade, etc., or an extruder type equipped with a screw. In addition, a reaction apparatus in which the above are optionally used in combination in view of the viscosity of the polymerized material is used and preferably practiced. It is preferred to use an apparatus having a blade which has good horizontal type stirring efficiency, and having a unit which can make the apparatus reduced pressure conditions.

Further preferably, a twin-screw extruder or a horizontal type reactor having a polymer seal and having a devolatilization structure is suitable.

As the material of the apparatus, a material which does not affect to the color tone of aromatic polycarbonate resin including a stainless such as SUS310, SUS316 and SUS304, etc., nickel, nitrided steel, etc., is preferred. Also, to the inside (the portion contacting with the polymer) of the apparatus, buffing or electrolytic polishing may be applied, or a metal plating treatment such as chromium, etc., may be carried out.

In the present invention, to the aromatic polycarbonate resin heightened in the molecular weight may be used a deactivator of the catalyst. In general, a method of deactivating the catalyst by adding a conventionally known acidic substance is suitably carried out. These substances (catalyst deactivating agent) may specifically include aromatic sulfonic acids such as p-toluenesulfonic acid, etc.; aromatic sulfonic acid esters such as butyl paratoluenesulfonate, etc.; aromatic sulfonic acid salts such as tetrabutyl phosphonium dodecylbenzenesulfonate, tetrabutylammonium paratoluenesulfonate, etc.; organic halides such as stearic acid chloride, butyric acid chloride, benzoyl chloride, toluenesulfonic acid chloride, benzyl chloride, etc.; alkyl sulfates such as dimethyl sulfate, etc.; phosphoric acids; phosphorous acids, etc.

Among these, the catalyst deactivator selected from the group consisting of paratoluenesulfonic acid, butyl paratoluenesulfonate, tetrabutylphosphonium dodecylbenzenesulfonate, and tetrabutyl ammonium paratoluenesulfonate can be suitably used.

Addition of the catalyst deactivator can be carried out to the polycarbonate resin by the conventionally known method after completion of the highly polymerizing reaction. For example, a method in which, after dispersing and mixing by a high speed mixer represented by a tumbling mixer, a Henschel mixer, a ribbon blender or a super mixer, the mixture is melted and kneaded by an extruder, a Banbury mixer, a roller, etc., can be optionally selected.

triphenyl phosphite, trisnonylphenyl phosphite, tris-(2,4-di-t-butylphenyl)phosphite, tetrakis(2,4-di-t-butylphenyl)-4,4'-biphenylene diphosphonite, tricresyl phosphite, 2,2-methylenebis(4,6-di-t-butylphenyl)octyl phosphite, etc. Among these, preferred are tris-(2,4-di-t-butylphenyl)phosphite represented by the following formula A, and n-octadecyl-3-(4'-hydroxy-3',5'-di-t-butylphenyl)propionate represented by the following formula B.

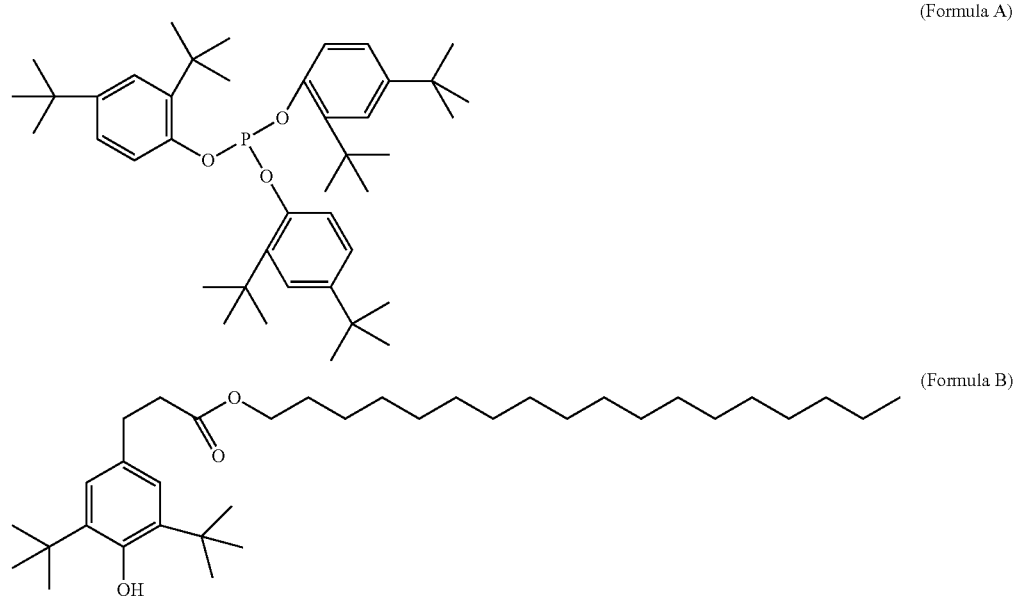

(Formula A)

(Formula B)

After deactivating the catalyst, a step of devolatilizing and removing a low boiling point compound in the polymer under a pressure of 0.013 to 0.13 kPa (0.1 to 1 torr), at a temperature of 200 to 350° C. may be provided. For the above procedure, a horizontal type apparatus equipped with a stirring blade excellent in surface renewal ability such as a paddle blade, lattice blade, spectacle-shaped blade, etc., or a thin film evaporator is suitably used.

Preferably, a twin-screw extruder or a horizontal type reactor having a polymer seal and having a vent structure is suitable.

Further, in the present invention, a heat resistant stabilizer, a hydrolysis stabilizer, an antioxidant, a pigment, a dye, a reinforcing agent or a filler, a UV absorber, a lubricant, a mold-releasing agent, a nucleating agent, a plasticizer, a fluidity improver, an antistatic agent, etc., may be added.

The heat resistant stabilizer may be used those conventionally known such as triphenylphosphine (P-Ph$_3$), etc.

Examples of the antioxidant may include tris-(2,4-di-t-butylphenyl)phosphite, n-octadecyl-β-(4'-hydroxy-3',5'-di-t-butylphenyl)propionate, pentaerythrityl-tetrakis[3-(3,5-di-t-butyl-4-hydroxyphenyl)propionate], n-octadecyl-β-(4'-hydroxy-3',5'-di-t-butylphenyl)propionate, 1,6-hexanediolbis[3-(3,5-di-t-butyl-4-hydroxyphenyl)propionate], triethylene glycol-bis-3-(3-t-butyl-4-hydroxy-5-methylphenylpropionate), 3,9-bis[2-{3-(3-t-butyl-4-hydroxy-5-methylphenyl)propionyloxy}-1,1-dimethylethyl]-2,4,8,10-tetraoxaspiro[5.5]undecane, These additives can be mixed with the polycarbonate resin in the same manner as the catalyst deactivator, by the conventionally known method. For example, a method in which each component is dispersed and mixed with a high speed mixer represented by a tumbling mixer, a Henschel mixer, a ribbon blender and a super mixer, and then, melting and kneading by an extruder, a Banbury mixer, a roller, etc., can be optionally selected. The addition step of the additive(s) may be simultaneously with the catalyst deactivator or different from the same.

2. Cyclic Carbonate Removal Step

In the cyclic carbonate removal step, at least part of the cyclic carbonate (hereinbelow, sometimes referred to as "by-produced cyclic carbonate") formed in the highly polymerizing step is removed out of the reaction system. That is, according to the preparation process of the present invention, the aromatic polycarbonate prepolymer is highly polymerized by linking with an aliphatic diol compound as a linking agent in the highly polymerizing reaction and simultaneously at least part of the by-produced cyclic carbonate produced by the reaction is removed out of the reaction system, whereby a highly polymerizing reaction of the aromatic polycarbonate prepolymer further proceeds.

Incidentally, the highly polymerizing step and the cyclic carbonate removing step may be physically and temporally separate steps, but may be carried out simultaneously, and are preferably carried out simultaneously. The preferred preparation process of the present invention includes a step in which the aromatic polycarbonate and the aliphatic diol compound are reacted in the presence of a transesterification catalyst to make higher polymerization as well as removing at least part of the by-produced cyclic carbonate produced in the highly polymerizing reaction out of the reaction system.

(1) Cyclic Carbonate

The by-produced cyclic carbonate is a compound represented by the following formula (h2):

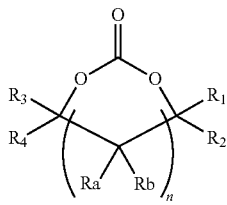

(h2)

In the formula (h2), Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring. The halogen atom is preferably a fluorine atom.

$R_1$ to $R_4$ each independently represent a hydrogen atom, a halogen atom or a linear or branched alkyl group having 1 to 5 carbon atoms; and the halogen atom is preferably a fluorine atom.

n is an integer of 1 to 30, preferably 1 to 6, more preferably 1 to 3, particularly preferably 1.

In the formula (h2), Ra and Rb are preferably each independently a hydrogen atom, a halogen atom, a linear or branched alkyl group having 1 to 8 carbon atoms, a cycloalkyl group having 3 to 8 carbon atoms, an aryl group having 6 to 10 carbon atoms, or an alkoxy group having 1 to 8 carbon atoms, or Ra and Rb may be bonded to each other to form an alicyclic ring having 3 to 8 carbon atoms. The halogen atom is preferably a fluorine atom.

$R_1$ to $R_4$ are preferably each independently a hydrogen atom, a fluorine atom or a methyl group.

n is preferably an integer of 1 to 6.

In the formula (h2), Ra and Rb are more preferably each independently a hydrogen atom or a linear or branched alkyl group having 1 to 5 carbon atoms, further preferably a linear or branched alkyl group having 1 to 4 carbon atoms. Particularly preferred specific examples may be mentioned a methyl group, an ethyl group, a propyl group, an n-butyl group, and an isobutyl group. $R_1$ to $R_4$ are each more preferably a hydrogen atom. n is more preferably an integer of 1 to 3.

The cyclic carbonate represented by the formula (h2) is more preferably a compound represented by the following formula (h3). In the formula (h3), n, Ra and Rb are the same as those defined in the formula (h2).

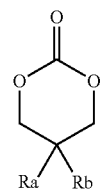

(h3)

Specific examples of the cyclic carbonate may be mentioned the compounds having the structures shown below.

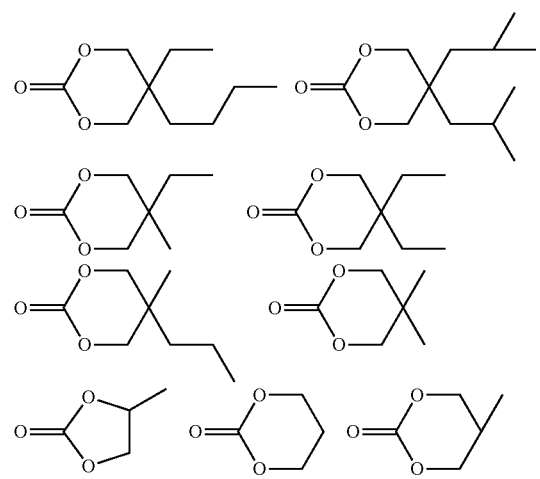

The preparation process using the aliphatic diol compound having the structure represented by the formula (g2) of the present invention has the merit that it can be highly polymerized with a high speed as compared with the preparation process of the polycarbonate by the conventional melting method. This is the common merit as the high molecular weight polycarbonate resin obtained by the linking higher polymerization method using the other aliphatic diol compounds as the linking agent found out by the present inventors.

On the other hand, according to the preparation process of the present invention, with the progress of highly polymerizing reaction, a cyclic carbonate having the specific structure is by-produced. And after removing the by-produced cyclic carbonate out of the reaction system, a high molecular weight polycarbonate resin having substantially the same skeletal structure as that of the homopolycarbonate resin can be obtained. The by-produced cyclic carbonate has the structure corresponding to the aliphatic diol compound to be used, and is considered to be a cyclic material derived from the aliphatic diol compound, but the reaction mechanism that the cyclic carbonate is by-produced with the higher polymerization is not necessarily clear.

For example, it can be considered mechanisms shown hereinbelow Scheme (1) or (2), but it is not necessarily clear. The preparation process using the aliphatic diol compound having the structure represented by the formulae (g2) to (g3) of the present invention is to react the aliphatic diol compound as a linking agent with the aromatic polycarbonate prepolymer to make the aromatic polycarbonate prepolymer linked higher polymerization product, and simultaneously to remove the cyclic carbonate having the structure corresponding to the structure of the by-produced aliphatic diol compound, and so long as within the above scope, it is not limited to the specific reaction mechanism.

Scheme (1):

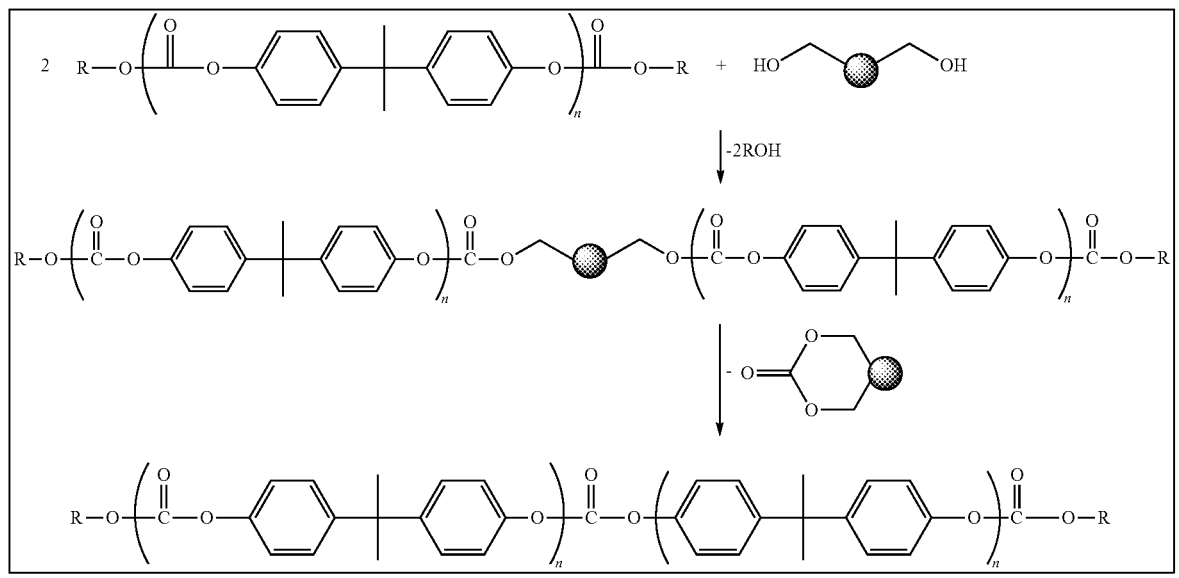

Scheme (2):

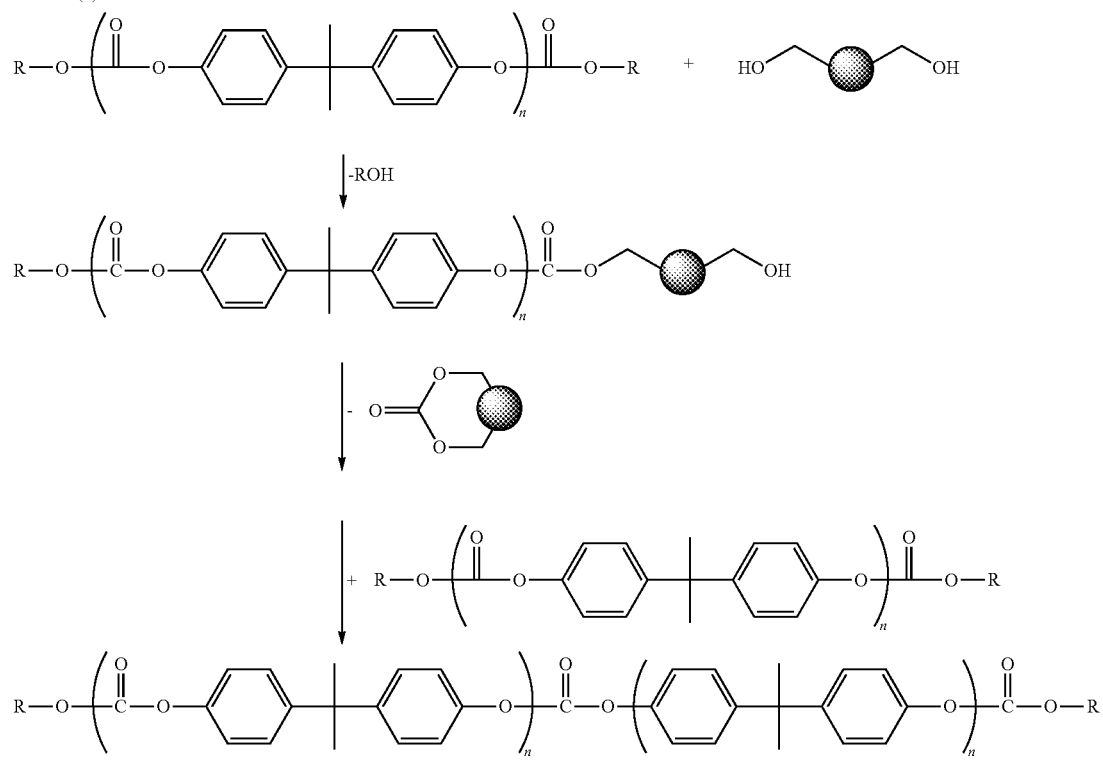

The highly polymerized aromatic polycarbonate resin obtained by the preparation process of the present invention using the aliphatic diol compound having the structure represented by the formula (g2) does not substantially contain the structural unit derived from the aliphatic diol compound, and the skeletal structure of the resin is substantially the same as that of the homopolycarbonate resin.

That is, since the structural unit derived from the aliphatic diol compound which is the linking agent is not contained in the skeletal structure or even if it is contained, the amount is extremely little, the resulting resin has extremely high thermal stability and excellent heat resistance. On the other hand, it can possess excellent qualities, while having the same skeletal structure as that of the conventional homopolycarbonate resin, such as a low N value, less ratio of the unit having a heterologous structure, and excellent in color tone, etc.

In a case that a structural unit derived from the aliphatic diol compound may be contained in the skeletal structure of the highly polymerized aromatic polycarbonate resin composition obtained by the preparation process of the present invention, a ratio of the structural unit derived from the aliphatic diol compound based on the whole structural unit amount of the highly polymerized aromatic polycarbonate resin is 1 mol % or less, more preferably 0.1 mol % or less.

(2) Removal Method of Cyclic Carbonate

As the method for removing the by-produced cyclic carbonate out of the reaction system, there may specifically include a method in which a distillate formed in the highly polymerizing step is distilled off out of the reaction system. That is, the by-produced cyclic carbonate is distilled off from the reaction system as a distillate containing it as well as a similarly by-produced aromatic monohydroxy compound such as phenol, etc., and unreacted starting compounds (the aliphatic diol compound, the carbonate diester, etc.). The distillation conditions are not particularly limited, and a temperature in the reactor when the distillate is distilled off from the reaction system is preferably 240° C. to 320° C., more preferably 260° C. to 310° C., further preferably 280° C. to 310° C.

Removal is carried out for at least part of the by-produced cyclic carbonate. It is most preferred to remove the whole by-produced cyclic carbonate, but it is generally difficult to completely remove the same. Even when it cannot be removed completely, it can be allowed to remain the cyclic carbonate in the produced aromatic polycarbonate resin. A preferred upper limit of the remained amount in the product is 3000 ppm, a more preferred upper limit is 1000 ppm, a further preferred upper limit is 500 ppm, and particularly preferred upper limit is 300 ppm.

3. Recycle Step

In the present invention, the by-produced cyclic carbonate removed out of the reaction system in the cyclic carbonate removal step is then reused in the recycle step. That is, the by-produced cyclic carbonate is hydrolyzed to convert it to an aliphatic diol compound used in the highly polymerizing step, and the aliphatic diol compound is reused as at least a part of the aliphatic diol compound used in the highly polymerizing step.

In the conventional preparation process of the high molecular weight polycarbonate resin in which an aromatic polycarbonate prepolymer is highly polymerized by using an aliphatic diol compound as a linking agent, the linking agent (aliphatic diol compound) was merely consumed in the step of polymerizing the aromatic polycarbonate prepolymer, but in the preparation process of the present invention, the linking agent is recovered and reused so that it can be continuously used substantially without consumed. Thus, the process has a merit of the melt polymerization method in which the polycondensation reaction is carried out with a high speed and a resin product having good quality can be obtained as well as it has a merit that the consumed starting materials are the aromatic dihydroxy compound and the carbonate diester alone, so that increase in the cost for the starting material can be suppressed.

According to the more specific method of the present invention, a distillate containing at least part of the cyclic carbonate by-produced in the highly polymerizing step is removed outside the reaction system in a cyclic carbonate removal step, then, in the recycle step, after the distillate is subjected to hydrolysis treatment, the aliphatic diol compound is recovered and reused by the method including an oil-water separating step in which the hydrolysate solution obtained by the hydrolysis treatment (hereinafter merely referred to as "hydrolysate solution") is separated to an aqueous layer and an oil layer containing the aliphatic diol compound, and a purification step in which the oil layer is purified to separate the aliphatic diol compound.

Also, according to another specific method of the present invention, a distillate containing at least part of the cyclic carbonate by-produced in the highly polymerizing step is removed outside the reaction system in the cyclic carbonate removal step, then, in the recycle step, after the distillate is subjected to hydrolysis treatment, the aliphatic diol compound is recovered and reused by the method including a purification step in which the hydrolysate solution obtained by the hydrolysis treatment is purified to separate the aliphatic diol compound.

(1) Hydrolysis Treatment

The by-produced cyclic carbonate derived from a linking agent (aliphatic diol compound), which is removed from the reaction system in the cyclic carbonate removal step is converted into the original aliphatic diol compound by the hydrolysis treatment. The by-produced cyclic carbonate is preferably distilled outside the reaction system with phenol by-produced similarly in the highly polymerizing step and the unreacted aliphatic diol compound, etc., as a distillate containing these compounds, and the distillate is subjected to hydrolysis treatment.

In the present invention, the distillate may be purified before subjecting to the hydrolysis treatment, but it is preferably subjected to the hydrolysis treatment without purification since the number of procedures is little.

Incidentally, in the present invention, the "distillate" is a material obtained in the cyclic carbonate removal step, and phenol by-produced in the highly polymerizing step and the unreacted aliphatic diol compound, etc., are contained therein, but a distillate containing a carbonate diester such as diphenylcarbonate, etc., obtained in the prepolymer preparation step or phenol may be mixed therein.

Specific method of the hydrolysis treatment is not particularly limited, and may be either of the alkali hydrolysis, acid hydrolysis, enzymolysis (for example, hydrolysis by lipase), etc., preferably the alkali hydrolysis using an alkali compound is employed.

The alkali compound to be used is not particularly limited, and specifically include those containing an alkali metal compound, an alkaline earth metal compound, a basic boron compound, etc.

The alkali metal compound may be exemplified by an inorganic alkali metal compound such as a hydroxide, a carbonate, a hydrogen carbonate compound, etc., and an organic alkali metal compound such as a salt with alcohols, phenols, organic carboxylic acids, etc., of an alkali metal. The alkali metal may be exemplified by lithium, sodium, potassium, rubidium, cesium, etc.

The alkaline earth metal compound may be exemplified by an inorganic alkaline earth compound such as a hydroxide, a carbonate, etc., and an organic alkaline earth metal compound such as a salt with alcohols, phenols, organic carboxylic acids, etc., of an alkaline earth metal. The alkaline earth metal may be exemplified by beryllium, calcium, magnesium, strontium, etc.

The basic boron compound may be exemplified by, for example, a sodium salt, a potassium salt, a lithium salt, a calcium salt, a magnesium salt, a barium salt, or a strontium salt, etc., of tetramethyl boron, tetraethyl boron, tetrapropyl boron, tetrabutyl boron, trimethylethyl boron, trimethylbenzyl boron, trimethylphenyl boron, triethylmethyl boron, triethylbenzyl boron, triethylphenyl boron, tributylbenzyl boron, tributylphenyl boron, tetraphenyl boron, benzyltriphenyl boron, methyltriphenyl boron, butyltriphenyl boron, etc.

Specific examples of the alkali compound may more include sodium hydrogen carbonate, sodium hydroxide, potassium hydroxide, cesium hydroxide, lithium hydroxide, potassium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate, cesium benzoate, lithium benzoate, disodium hydrogen phosphate, dipotassium hydrogen phosphate, dilithium hydrogen phosphate, disodium phenyl phosphate, sodium gluconate, disodium salt, dipotassium salt, dicesium salt or dilithium salt of bisphenol A, sodium salt, potassium salt, cesium salt or lithium salt of phenol, sodium methoxide, sodium-t-butoxide and sodium ethoxide, etc. Among these, sodium hydrogen carbonate, sodium hydroxide and sodium carbonate, etc., are preferably used.

The alkali compound is generally added to the distillate in the form of an aqueous solution. An alkali concentration of the aqueous solution of the alkali compound (hereinbelow, it is referred to "alkali water") is preferably 0.001 to 12 mol/L, more preferably 0.001 to 3 mol/L, further preferably 0.01 to 1.1 mol/L, and it can be optionally selected depending on the kind of the alkali to be used. For example, when sodium hydrogen carbonate is used as the kind of the alkali, it is 0.001 to 1.1 mol/L, when sodium methoxide is used, it is 0.001 to 2.1 mol/L, and when sodium carbonate is used, it is 0.001 to 2.1 mol/L. Incidentally, when sodium hydroxide is used, it is preferably 2 to 12 mol/L.

A used ratio of the alkali water to the distillate is not particularly limited, and the alkali water is preferably used with a ratio of 0.1 to 1.5-fold (weight ratio), more preferably 0.3 to 1.3-fold (weight ratio) based on the distillate.

The alkali hydrolysis can be preferably carried out within the temperature range of at room temperature (25° C.) to 120° C., more preferably at room temperature (25° C.) to 100° C. Also, the alkali hydrolysis may be preferably carried out at a reflux temperature.

According to the hydrolysis treatment such as an alkali hydrolysis, etc., the cyclic carbonate in the distillate is converted into an aliphatic diol compound. A conversion ratio (%) from the cyclic carbonate to the aliphatic diol compound is not particularly limited, desirably 50 to 100%, particularly desirably 80 to 100%.

Incidentally, when a carbonate diester such as diphenylcarbonate, etc., is contained in the distillate as an unreacted starting compound, according to the hydrolysis treatment, for example, the unreacted diphenylcarbonate is simultaneously hydrolyzed to be phenol, so that it can be recovered and reused.

(2) Oil-water Separating Step

In the recycle step, after the distillate is subjected to hydrolysis treatment, the hydrolysate solution obtained by the hydrolysis treatment is purified to separate an aliphatic diol compound. In this case, the hydrolysate solution can be directly purified, and, after subjecting to an oil-water separating step in which the hydrolysate solution may be separated to an aqueous layer and an oil layer containing the aliphatic diol compound, the oil layer is purified to separate the aliphatic diol compound.

When the oil-water separating step is carried out, any of oil-water separating apparatuses which have conventionally been known can be used. For example, they may include a general separating funnel, a conventionally known liquid separating apparatus (mixer-settler) which is suitable for a large amount of the treatment, a multistage mixer, a decanter type contactor, a gravity fractionation column type contactor, a continuous type liquid separation apparatus, etc. Also, a commercially available oil-water separating agent, etc., may be used.

In the oil-water separating step, an oil-water separating means selected from usually employed oil-water separating means depending on necessity can be applied. For example, the oil-water separating step may comprise at least one step selected from the group consisting of a step of adding an acid or an alkali to the hydrolysate solution, a step of adding an organic solvent to the hydrolysate solution, a step of heating the hydrolysate solution, and a step of adding a water-soluble salt to the hydrolysate solution. According to this procedure, oil-water separation is preceded more effectively, and a recovery ratio of the aliphatic diol compound can be more improved.

The step of adding an acid or an alkali to the hydrolysate solution is, for example, in a case that the hydrolysis treatment is carried out by an alkali hydrolysis, preferably a step of adding an acid, and in a case that the hydrolysis treatment is carried out by an acid hydrolysis, preferably a step of adding an alkali. The acid and alkali to be used are not particularly limited, and may be optionally selected from the generally used acidic compound and the alkali compound.

Examples of the acidic compound may include an inorganic acid such as hydrochloric acid, nitric acid, sulfuric acid, phosphoric acid, carbonic acid, perchloric acid, boric acid, hydrofluoric acid, etc., and an organic acid such as acetic acid, formic acid, citric acid, and oxalic acid, etc. Among these, an inorganic acid is preferred, and sulfuric acid, hydrochloric acid, etc., are more preferred.

The alkali compound may be mentioned the already mentioned inorganic base of an alkali metal compound and an alkaline earth metal compound, etc., a hydroxide of a quaternary ammonium such as tetraalkyl ammonium, etc., ammonia, and an amine, etc. Among these, an inorganic base is preferred.

An added amount of the acid or the alkali to the hydrolysate solution is not particularly limited. In a case that the acid is added to the hydrolysate solution, it is preferred to add an amount that the aqueous layer portion of the hydrolysate solution becomes neutral, and more preferred is to add an amount that becomes acidic. Also, in a case that the alkali is added to the hydrolysate solution, it is preferred to add an amount that the aqueous layer portion of the hydrolysate solution becomes neutral, and more preferred is to add an amount that becomes alkaline.

The organic solvent to be used in the step of adding an organic solvent to the hydrolysate solution is not particularly limited. The organic solvent to be added is preferably an organic solvent incompatible with water. Also, the organic solvent preferably has a large difference in specific gravity from that of water, and the specific gravity thereof is more preferably 0.9 or lower. Examples of the organic solvent may include an aromatic hydrocarbon such as benzene, toluene, xylene, etc., an aliphatic hydrocarbon such as pentane, hexane, heptane, octane, cyclohexane, etc., an ether solvent such as diethyl ether, diisopropyl ether, etc. Among these, an aromatic hydrocarbon or an aliphatic hydrocarbon is preferred, and heptane, toluene, benzene, etc., are more preferred.

An amount of the organic solvent to be added can be optionally selected depending on the liquid amount of the hydrolysate solution, etc. For example, it is preferably 10% by weight or more in the total weight containing the hydrolysate solution and the organic solvent, more preferably 10 to 50% by weight, further preferably 15 to 40% by weight, particularly preferably 15 to 30% by weight.

The step of heating the hydrolysate solution is not particularly limited so long as it is a step of heating the hydrolysate solution to the temperature at which oil-water separation is promoted. A temperature of the hydrolysate solution to be heated is preferably 30° C. or higher, more preferably 30 to 80° C., further preferably 40 to 70° C., particularly preferably 45 to 60° C. The method of heating is not particularly limited, and can be optionally selected depending on the apparatuses to be used for oil-water separation, etc.

The step of heating the hydrolysate solution tends to promote oil-water separation by combining with other oil separation means.

A step of adding a water-soluble salt to the hydrolysate solution is not particularly limited so long as it is a step of making the specific gravity of the aqueous layer larger than that before the addition. According to this operation, oil-water separation is promoted. A step of adding the water-soluble salt to the hydrolysate solution may be a step of adding the water-soluble salt itself to the hydrolysate solution, or a step of adding an aqueous solution of the water-soluble salt to the same.

The water-soluble salt is not particularly limited, and it can be optionally selected from the generally used water-soluble salt. The water-soluble salt may be mentioned an alkali metal salt, an alkaline earth metal salt, a quaternary ammonium salt, etc. The water-soluble salt may be an inorganic acid salt or an organic acid salt, and an inorganic acid salt is preferred. Examples of the water-soluble salt may specifically include an inorganic acid salt of an alkali metal such as sodium chloride, sodium sulfate, potassium chloride, etc., and an inorganic acid salt of an alkaline earth metal such as calcium chloride, magnesium sulfate, etc.

When the water-soluble salt is to be added to the hydrolysate solution, an amount to be added thereof can be optionally selected depending on the kind of the water-soluble salt, etc. An amount of the water-soluble salt to be added can be made, for example, an amount that the concentration of the aqueous layer contained in the hydrolysate solution becomes 5% by weight or higher, preferably 5 to 20% by weight, more preferably 5 to 10% by weight.

The oil-water separating means may be applied one kind alone, or may be applied two or more in combination. For example, the step of heating the hydrolysate solution may be carried out alone in the oil-water separating step, but preferably used in combination with at least one of the step of adding an acid or an alkali to the hydrolysate solution, the step of adding an organic solvent to the hydrolysate solution and the step of adding a water-soluble salt to the hydrolysate solution, and more preferably used in combination with the step of adding an acid or an alkali to the hydrolysate solution and the step of adding an organic solvent to the hydrolysate solution.

A washing step is preferably carried out to the oil layer after oil-water separation. The washing step can be carried out, for example, by mixing the oil layer with water and subjecting to an oil-water separation. When water is used for the washing step, the water may contain a water-soluble salt. Also, after mixing water with the oil layer, a water-soluble salt may be added thereto before the oil-water separation. Details of the water-soluble salt to be used in the washing step are the same as the already described water-soluble salt to be added to the hydrolysate solution.

In the oil-water separation in the washing step, a mixture of the oil layer and water is preferably heated. Details of the heating in the washing step are the same as the already described heating of the hydrolysate solution in the oil-water separating means.

The washing step may be carried out one alone, or may be carried out two or more times.

The oil layer after the oil-water separation is then applied to a purification step. Incidentally, the purification step is preferably carried out after the oil-water separation, but the distillate before the hydrolysis treatment may be purified, and in such a case, purification after the oil-water separation may not be carried out. When the distillate before the hydrolysis treatment is to be purified, it is an object mainly to remove phenol, an unreacted aliphatic diol compound or a carbonate diester (diphenylcarbonate, etc.) contained in the distillate before the hydrolysis treatment.

When the alkali hydrolysis is employed as the hydrolysis treatment, the oil layer after the oil layer separation can be directly purified, and the oil layer after the oil layer separation is subjected to neutralization, or washing with water, and then, it may be purified. Also, a solid such as an alkali salt, etc., contained in the oil layer is filtered off, and then, it may be purified.

The aqueous layer after the oil-water separation may be discharged after neutralization, or may be reused (recycled) by recovering it as water for the alkali water. Even when it is discharged, according to the process of the present invention, an amount of the discharged water can be made an extremely minimum amount. Taking the fact that a large amount of the discharged water is a significant defect in the conventional interfacial polymerization method into consideration, it can be said that it is a great merit of the present invention that an amount of the discharged water can be markedly reduced as compared with that of the interfacial polymerization method.

(3) Purification Step

The oil layer separated in the oil-water separating step is purified in the subsequent purification step to separate the aliphatic diol compound. Incidentally, in the oil layer, in addition to the aliphatic diol compound, by-produced phenol, etc., may be contained so that the phenol, etc., are similarly separated and can be recovered and reused. The purification method is not particularly limited, and distilling purification are preferably carried out.

Before subjecting to the distilling purification, a minute amount of water contained in the oil layer may be neutralized or washed. Also, sodium salt, etc., used in the alkali hydrolysis may be contained in the oil layer, so that these materials may be previously removed by filtration.

In the case of the distilling purification, a distillation temperature is not particularly limited, and can be followed by the conventionally known conditions (for example, preparation conditions of butylethylpropane glycol described in JP Hei5-81573B, etc.), and specifically, an overhead temperature of the distillation apparatus is preferably 200° C. or lower, more preferably 180° C. or lower, further preferably 170° C. or lower, particularly preferably 120 to 150° C., most preferably 130 to 135° C.

Also, a pressure reduction degree at the distillation is not particularly limited, and can be followed by the conventionally known conditions (for example, preparation conditions of butylethylpropane glycol described in JP Hei5-81573B, etc.), and it is preferably 100 mgHg (13.3 kPa) or lower, more preferably 50 mmHg (6.7 kPa) or lower, further preferably 30 mmHg (4.0 kPa) or lower, particularly preferably 20 mmHg (2.7 kPa) or lower, most preferably 1 mmHg (0.1 kPa) to 4 mmHg (0.5 kPa).

The distillation apparatus may be optionally used the conventionally known general apparatus. For example, a plate type distillation apparatus, a filling type distillation apparatus (a regular type distillation apparatus or a random type distillation apparatus), a Vigreux type distillation apparatus, a Hempel type distillation apparatus, a Widmer type distillation apparatus, a single distillation apparatus, a continuous type distillation apparatus, a batch type distillation apparatus, etc.

When the hydrolysate solution is to be directly purified without subjecting to oil-water separation, the preferred purification method is distilling purification, and the hydrolysis reaction and the distilling purification can be carried out with one step by using an integrated apparatus (hydrolysis distillation). By carrying out the hydrolysis reaction and distilling purification with one step, there is a merit that a number of the steps can be reduced.

As the integrated apparatus, there may be used, for example, a rectifying column is vertically connected to a usual reactor or distillation stills, etc. After subjecting to the hydrolysis reaction in a reactor, the reaction mixture (the hydrolysate solution) is further heated under reduced pressure without transferring the same, phenol and a cyclic carbonate can be separated. The conditions such as a distillation temperature and a pressure reduction degree, etc., are the same as that carried out to the oil layer after the oil-water separation as mentioned above.

A yield (%) of the aliphatic diol compound recovered by the purification is not particularly limited, and desirably 50 to 100% by weight of the aliphatic diol compound to be used in the highly polymerizing step may be recovered, and more desirably 65 to 100% by weight.

Also, a chemical purity (%) and a metal concentration (ppm) of the aliphatic diol compound to be recovered by the purification may vary depending on the conditions of the hydrolysis treatment or the purification step, etc., and it is possible to accomplish the chemical purity of about 80% or more and the metal concentration of about 100 ppm or less.

As mentioned above, the recycle step may include (a) a method in which the distillate from the highly polymerizing step is subjected to hydrolysis treatment, then, the oil layer separated via the oil-water separating step is purified and recycled, (b) a method in which the distillate from the highly polymerizing step is firstly purified, then, subjected to hydrolysis treatment, and the oil layer separated via the oil-water separating step is further purified and recycled, and (c) a method in which the distillate from the highly polymerizing step is firstly purified, then, subjected to hydrolysis treatment, and the oil layer separated via the oil-water separating step is directly recycled, etc. Among these, (a) is most preferred in the point of efficiency.

Hereinbelow, specific example of the preparation process of the present invention is explained by referring to the drawings.

FIG. 1 to FIG. 4 are each, among the preparation process of the present invention, an example of a flow chart of preparation steps in the case where bisphenol A (abbreviation; BPA) which is an aromatic dihydroxy compound, diphenylcarbonate (abbreviation; DPC) which is a carbonate diester, and 2-butyl-2-ethyl-propane-1,3-diol (abbreviation; BEPG) which is a linking agent (aliphatic diol compound) are used as starting materials.

Among these, FIG. 1 is a flow chart showing the steps of subjecting the distillate from the highly polymerizing step (in FIG. 1, it is shown as "linking removal reaction") to hydrolysis treatment and oil-water separation, then, purifying the oil layer to separate the aliphatic diol compound (in FIG. 1, it is shown as "linking agent") and reuse the same.

Figure 2:
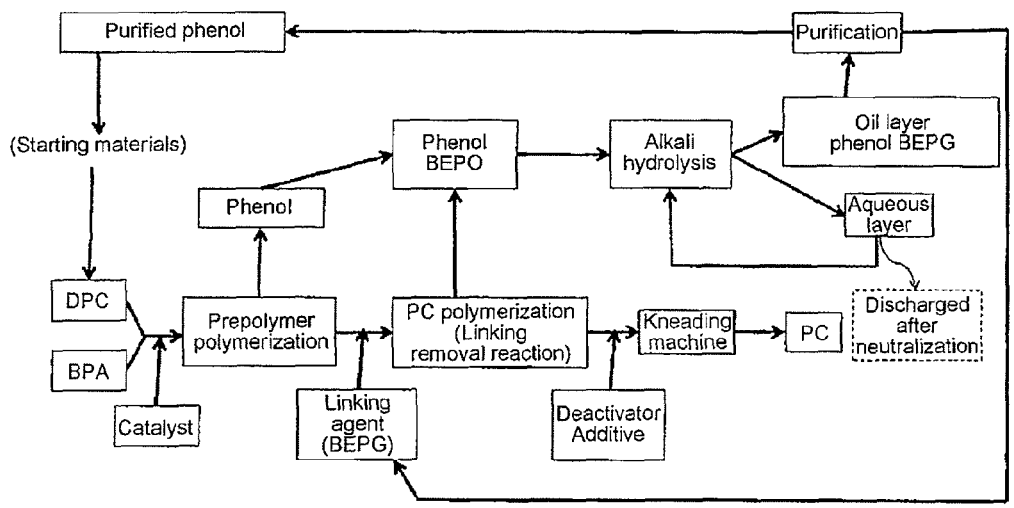
FIG. 2 is a flow chart of preparation steps showing an example of the preparation process of the present invention.

FIG. 2 is a flow chart showing the steps, in the method shown in FIG. 1, of mixing the distillate from the highly polymerizing step (linking removal reaction) with the distillate containing the by-produced phenol distilled out from the prepolymer preparation step, subjecting the mixed solution to hydrolysis treatment and then oil-water separation, subsequently purifying the oil layer to separate the aliphatic diol compound and reuse the same.

Figure 3:
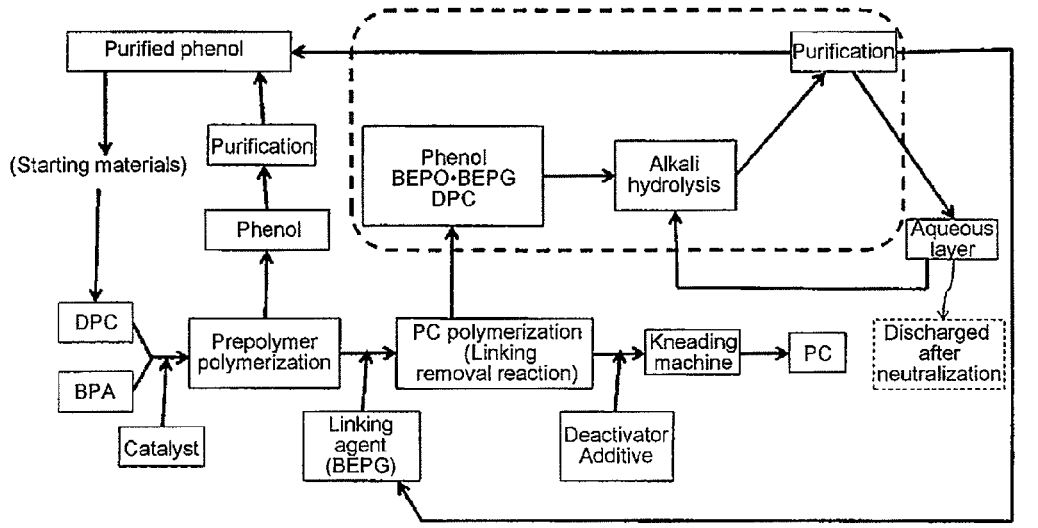
FIG. 3 is a flow chart of preparation steps showing an example of the preparation process of the present invention.

FIG. 3 is a flow chart showing the steps of subjecting the distillate from the highly polymerizing step (linking removal reaction) to hydrolysis treatment, then, purifying the hydrolysate solution to separate the aliphatic diol compound and reuse the same. Here, the hydrolysis treatment and the purification are carried out in an integrated apparatus (hydrolysis distillation). According to this method, it has a merit that a number of steps is reduced in the point that an oil-water separation step is not contained after the hydrolysis treatment.

Figure 4:
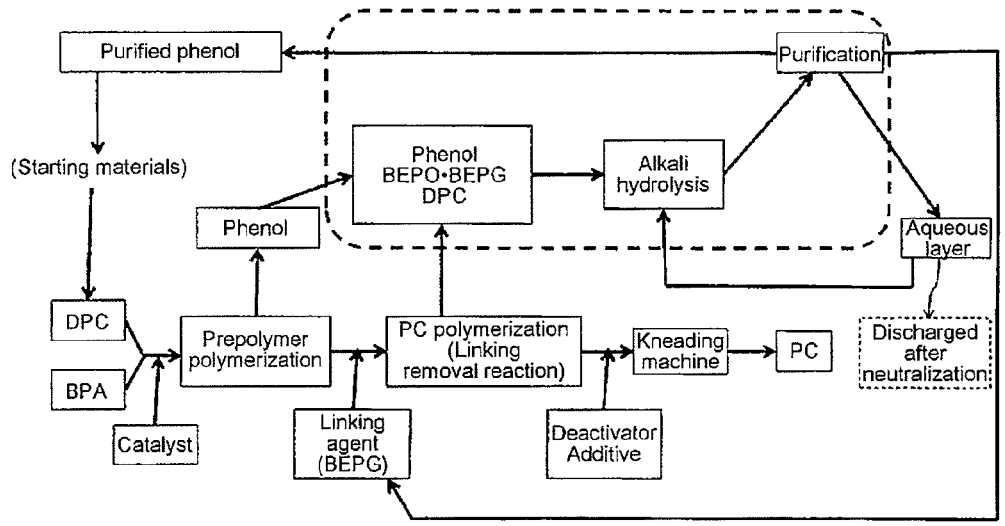
FIG. 4 is a flow chart of preparation steps showing an example of the preparation process of the present invention.

FIG. 4 is a flow chart showing the steps, in the method shown in FIG. 3, of mixing the distillate from the highly polymerizing step (linking removal reaction) with the distillate containing the by-produced phenol distilled out from the prepolymer preparation step, and purifying the hydrolysate solution to separate the aliphatic diol compound and reuse the same. Here, similarly in the case of FIG. 3, the hydrolysis treatment and the purification are carried out in an integrated apparatus (hydrolysis distillation). According to this method, in addition to the case of FIG. 3, it has a merit that a number of steps is further reduced in the point that the recovering step of the by-produced phenol from the prepolymer preparation step is not carried out by a separate step.

FIG. 1 is explained as follows. First, in the aromatic polycarbonate prepolymer preparation step ("prepolymer preparation step"), BPA and DPC are reacted in the presence of a catalyst (transesterification catalyst) to prepare an aromatic polycarbonate prepolymer. With regard to the by-producing phenol at this time, after purification, it is recovered and reused (recycled) as a starting material for preparing DPC.

Next, BEPG which is a linking agent (aliphatic diol compound) is acted on the aromatic polycarbonate prepolymer obtained in the prepolymer preparation step to carry out the transesterification, whereby the aromatic polycarbonate prepolymers are linked to highly polymerize ("highly polymerizing step" or "linking removal reaction"). The transesterification catalyst to be used is those used in the aromatic polycarbonate prepolymer preparation step.

The highly polymerized aromatic polycarbonate resin obtained in the highly polymerizing step is mixed with a catalyst deactivating agent or an additive to be used depending on necessity, and after subjecting to the step of compounding by a kneading machine, a product is produced.

On the other hand, the distillate containing the by-produced cyclic carbonate (5-butyl-5-ethyl-1,3-dioxan-2-one; BEPO) derived from BEPG and the by-produced phenol, etc., formed in the highly polymerizing step is removed outside the reaction system. The distillate was then subjected to an alkali hydrolysis treatment.

After the alkali hydrolysis treatment, oil-water separation is carried out to separate the oil layer and the aqueous layer, and the oil layer containing BEPG and the by-produced phenol is distilled and purified. The BEPG recovered by distilling purification is reused in the highly polymerizing step as a linking agent. The phenol similarly recovered is reused as a starting material for preparing DPC.

The aqueous layer after the oil-water separation can be treated as discharging water after neutralization, or can be recovered and reused in the hydrolysis treatment step as water for an alkali water.

In FIG. 2, the prepolymer preparation step and the highly polymerizing step are the same as those of FIG. 1, but the distilled solution containing the by-produced phenol from the prepolymer preparation step is mixed with the distillate from the highly polymerizing step. Thereafter, in the same manner as in FIG. 1, the alkali hydrolysis treatment is carried out to the distillate. After the alkali hydrolysis treatment, oil-water separation is carried out to separate the oil layer and the aqueous layer, and the oil layer containing BEPG and the by-produced phenol is distilled to purify. The BEPG recovered by distilling purification is reused in the highly polymerizing step as a linking agent. The phenol similarly recovered is reused as a starting material for preparing DPC.

FIG. 3 is explained as follows. The prepolymer preparation step and the highly polymerizing step are the same as those of FIG. 1. The phenol by-produced in the prepolymer step is, after purification, recovered and reused (recycled) as a starting material for preparing DPC.

The distillate containing the by-produced cyclic carbonate (5-butyl-5-ethyl-1,3-dioxan-2-one; BEPO) derived from BEPG and the by-produced phenol, etc., formed in the highly polymerizing step is removed outside the reaction system, and supplied to an integrated apparatus at which hydrolysis and distilling purification can be carried out with one tower, then, the alkali hydrolysis treatment is carried out.

After the alkali hydrolysis treatment, the hydrolysate solution containing BEPG and the by-produced phenol is distilled to purify not via an oil-water separating step. The BEPG recovered by the distilling purification is reused in the highly polymerizing step as a linking agent, and the phenol similarly recovered is reused as a starting material for preparing DPC.

In FIG. 4, the prepolymer preparation step and the highly polymerizing step are the same as those of FIG. 1, but the distillate containing the by-produced phenol from the prepolymer preparation step is mixed with the distillate from the highly polymerizing step. Thereafter, in the same manner as in FIG. 3, the mixture is supplied to an integrated apparatus at which hydrolysis and distilling purification can be carried out with one tower, and via the alkali hydrolysis treatment and the distillation with purification step, the recovered BEPG is reused in the highly polymerizing step as the linking agent, and the phenol similarly recovered is reused as a starting material for preparing DPC.

The preparation process of the present invention is sufficient if it comprises the highly polymerizing step, the cyclic carbonate removal step and the recycle step, and may be carried out by a batch treatment or by a continuous treatment. When the preparation process of the present invention is carried out by the batch treatment, the aliphatic diol compound obtained in the recycle step can be supplied to the highly polymerizing step in the batch treatment at the next time or later. Also, when the preparation process of the present invention is carried out by the continuous treatment, the aliphatic diol compound obtained in the recycle step can be continuously added to the highly polymerizing step with the aromatic polycarbonate prepolymer.

The preparation process of the present invention may contain a step of temporary store the distillate or the hydrolysis treatment solution containing the cyclic carbonate, the oil layer or the aliphatic diol compound formed in the recycle step, etc., in a storage tank, a buffer tank, etc., if necessary.

4. Highly Polymerized Aromatic Polycarbonate Resin

According to the preparation process of the present invention, by the transesterification reaction of the aromatic polycarbonate prepolymer and the aliphatic diol compound, a weight average molecular weight (Mw) of the aromatic polycarbonate resin after the reaction can be heightened 5,000 or more than the weight average molecular weight (Mw) of the aromatic polycarbonate prepolymer, more preferably heightened 10,000 or more, further preferably heightened 15,000 or more.

The weight average molecular weight (Mw) of the highly polymerized aromatic polycarbonate resin prepared by the preparation process of the present invention is preferably 30,000 to 100,000, more preferably 30,000 to 80,000, further preferably 35,000 to 75,000, and whereas the resin has a high molecular weight, it also has high fluidity. According to this constitution, in a case that it is used for the uses such as blow molding, extrusion molding, injection molding, etc., a molding material excellent in moldability can be obtained.

Also, in the highly polymerized aromatic polycarbonate resin prepared by the method of the present invention, an N value (structural viscosity index) represented by the following numerical formula (1) is preferably 1.3 or less, more preferably 1.28 or less, more preferably 1.25 or less, particularly preferably 1.23 or less.

$$N \text{ value} = (\log(Q160 \text{ value}) - \log(Q10 \text{ value}))/(\log 160 - \log 10) \quad (1)$$

In the numerical formula (1), Q160 value represents a melt flow volume (ml/sec) (measured by using Type CFT-500D manufactured by Shimadzu Corporation (hereinafter the same), calculated from stroke=7.0 to 10.0 mm) per a unit time measured at 280° C. and a load of 160 kg, and Q10 value represents a melt flow volume (ml/sec) (calculated from stroke=7.0 to 10.0 mm) per a unit time measured at 280° C. and a load of 10 kg. Incidentally, nozzle diameter: 1 mm×nozzle length: 10 mm.

A structural viscosity index "N value" is used as an index of a branching degree of the aromatic polycarbonate resin. The N value in the highly polymerized aromatic polycarbonate resin of the present invention is low, and a contained ratio of the branched structure is little and a ratio of the linear structure is high. Fluidity of a polycarbonate resin generally tends to become high (Q value becomes high) when a ratio of the branched structure is made larger at the same Mw, but the highly polymerized aromatic polycarbonate resin prepared by the preparation process of the present invention accomplishes high fluidity (high Q value) while maintaining the N value to a low value.

Also, the highly polymerized aromatic polycarbonate resin obtained by the preparation process of the present invention has good hue.

Evaluation of the hue of the aromatic polycarbonate resin is generally represented by a YI value. In general, the YI value of a branched aromatic polycarbonate resin obtained by the interfacial polymerization method shows 0.8 to 1.0. On the other hand, a high molecular weight product of the aromatic polycarbonate obtained by the melt polymerization method shows the YI value of 1.7 to 2.0 due to lowering in quality accompanied by the preparation step. However, the YI value of the highly polymerized aromatic polycarbonate resin obtainable by the preparation process according to the present invention shows the equivalent YI value to the aromatic polycarbonate obtained by the interfacial polymerization method, and worsening in hue is not observed.

Also, by using starting materials having higher purities, a color tone or a molecular weight retaining ratio (an index showing how lowering in a molecular weight can be suppressed when heat detention is applied under high temperatures) can be further improved.

Specifically, a molecular weight (Mw) retaining ratio after the heat detention test (at 360° C. for 60 minutes) of the highly polymerized aromatic polycarbonate resin obtained by the preparation process of the present invention can be made 50% or more, more preferably 70% or more.

EXAMPLES

Hereinbelow, the present invention is explained by referring to Examples, but the present invention is not limited by these Examples. Incidentally, the measured values in Examples were measured by using the following methods or apparatuses.

1) Weight average molecular weight (Mw) calculated on polystyrene: By using GPC, and chloroform as an eluent, a calibration curve was prepared by using standard polystyrenes manufactured by TOSOH CORPORATION, "PStQuick MP-M", molecular weights (molecular weight distribution=1) of which have been known. From the measured standard polystyrenes, elution times of each peak and molecular weight values were plotted, and approximation by a tertiary method was carried out to prepare a calibration curve. The weight average molecular weight (Mw) and the number average molecular weight (Mn) were obtained from the following calculation formulae.

$w = \Sigma(W_i \times M_i) \div \Sigma(W_i)$ $n = \Sigma(N_i \times M_i) \div \Sigma(N_i)$ Here, i represents an $i^{th}$ separation point when the molecular weight M is divided, $W_i$ represents a weight at the $i^{th}$, $N_i$ represents a molecule number at the $i^{th}$, and $M_i$ represents a molecular weight at the $i^{th}$. Also, the molecular weight M represents a polystyrene molecular weight value at the same elution time of the calibration curve.

[Measurement Conditions]
Apparatus: HLC-8320GPC, manufactured by TOSOH CORPORATION
Column: Guard column: TSK guard column SuperMPHZ-M×1
Analysis column: TSKgel SuperMultipore HZ-M×3
Solvent: HPLC grade chloroform
Injected amount: 10 μL
Sample concentration: 0.2 w/v % HPLC grade chloroform solution
Solvent flow rate: 0.35 ml/min
Measurement temperature: 40° C.
Detector: RI 2) Terminal hydroxy group concentration (ppm): A complex formed by the polymer and titanium tetrachloride in a methylene chloride solution was measured by UV/visible spectroscopy (546 nm). Or, it was measured by observing the terminal hydroxy group from the analytical result of $^1$H-NMR.

A terminal hydroxy group concentration in the prepolymer (PP) by $^1$H-NMR measurement was obtained by dissolving 0.05 g of the resin sample in 1 ml of deuterium-substituted chloroform containing 0.05 w/v % TMS, and measuring $^1$H-NMR at 23° C. Specifically, the terminal hydroxy group concentration (OH concentration) in the PP was calculated from the integration ratio of the hydroxy group peak at 4.7 ppm and the phenyl and phenylene groups (terminal phenyl group and phenylene group derived from BPA skeletal structure) at around 7.0 to 7.5 ppm.

Incidentally, details of the measurement conditions of $^1$H-NMR are as follows.
Apparatus: LA-500 (500 MHz) manufactured by JEOL Ltd.
Measured nucleus: $^1$H
Relaxation delay: 1 s
x_angle: 45 deg
x_90_width: 20 μs
x_plus: 10 μs
Scan: 500 times 3) Terminal phenyl group concentration (end-capped terminal group concentration, Ph terminal concentration; mol %): From the analytical results of the $^1$H-NMR, it was obtained by the following mentioned numerical formula.

$$Ph \text{ terminal amount (mol\%)} = \frac{(H \text{ areal ratio of terminal-Ph-}/2)}{(H \text{ areal ratio of terminal-Ph-}/2 + H \text{ areal ratio of -Ph-}/8)} \times 100$$

Specifically, 0.05 g of a resin sample was dissolved in 1 ml of deuterium-substituted chloroform (containing 0.05 w/v % TMS), $^1$H-NMR spectrum thereof was measured at 23° C., and a terminal phenyl group amount and terminal phenyl group concentration of the PP were measured from the integration ratio of the terminal phenyl group at around 7.4 ppm and the phenylene group (derived from BPA skeletal structure) at around 7.0 to 7.3 ppm.

Incidentally, details of the measurement conditions of $^1$H-NMR are as follows.
Apparatus: LA-500 (500 MHz) manufactured by JEOL Ltd.
Measured nucleus: $^1$H
Relaxation delay: 1 s
x_angle: 45 deg
x_90_width: 20 s
x_plus: 10 μis
Scan: 500 times A whole terminal group amount of the polymer can be calculated from the terminal hydroxy group concentration and the terminal phenyl group concentration.

Incidentally, chemical purities of the aliphatic diol compound used hereinbelow Examples and Comparative examples are each 98 to 99%, a chlorine content is 0.8 ppm or less, contents of an alkali metal, an alkaline earth metal, titanium and a heavy metal (iron, nickel, chromium, zinc, copper, manganese, cobalt, molybdenum, tin) are each 1 ppm or less. Chemical purities of the aromatic dihydroxy compound and the carbonate diester are 99% or more, a chlorine content is 0.8 ppm or less, contents of an alkali metal, an alkaline earth metal, titanium and a heavy metal (iron, nickel, chromium, zinc, copper, manganese, cobalt, molybdenum, tin) are each 1 ppm or less.

Hereinbelow Examples, 2,2-bis(4-hydroxyphenyl)propane is sometimes abbreviated to as "BPA", a prepolymer as "PP", a hydroxy group as "OH group" and a phenyl group as "Ph".

Example 1

According to a continuous preparation apparatus having two primary starting materials preparation tanks, two linking agent preparation tanks, two vertical type stirring reactors and one horizontal type stirring reactor, a polycarbonate resin was prepared by the following method.

Into the first vertical type stirring polymerization tank (Maxblend® stirring blade polymerization tank manufactured by Sumitomo Heavy Industries, Ltd., capacity; 750 L) were charged 127.904 kg of diphenylcarbonate and 117.504 kg of BPA so that a molar ratio of the starting materials (diphenylcarbonate (DPC)/bisphenol A (BPA)) became 1.16. Further, 0.1 w/v % of an aqueous cesium carbonate ($Cs_2CO_3$) solution was added to the mixture with an amount that the added amount of cesium carbonate became 0.5 μmol based on 1 mol of BPA. After replacing the atmosphere with nitrogen, the starting materials was melted at 160° C., and then, transesterification was carried out at a vacuum degree of 100 torr (13 kPa), at a heating medium temperature of 215° C. and a stirring rate of 150 rpm for 2 hours and 10 minutes while removing the forming phenol. The formed phenol was cooled by the condenser and recovered, and then, used as one of the components of the starting materials of DPC.

The polymerization reaction solution obtained in the first vertical type stirring reactor was supplied into the second vertical type stirring reactor (Double helical stirring blade polymerization tank manufactured by Sumitomo Heavy Industries, Ltd., capacity; 500 L) through a transport pipe.

Transesterification was further carried out at a vacuum degree of 15 torr (2 kPa), at a heating medium temperature of 240° C. and a stirring rate of 40 rpm for 1 hour while removing the forming phenol. Subsequently, transesterification was carried out at a vacuum degree of 1 torr (0.13 kPa) or lower, at a heating medium temperature of 275° C. and a stirring rate of 20 rpm for 2 hours and 45 minutes while removing the forming phenol.

The formed phenol was cooled by the condenser and recovered, and then, used as one of the components of the starting materials of DPC.

A weight average molecular weight (Mw) of the obtained prepolymer (PP) calculated on polystyrene was 27,000, a terminal phenyl group concentration was 5.3 mol % and a terminal hydroxy group concentration was 200 ppm.

To 23.5 kg/hr of the prepolymer obtained by the step was added melted 2-ethyl-2-butyl-propane-1,3-diol (BEPG) with 245 g/hr, and after mixing with a kneader (SIKRC reactor manufactured by Kurimoto Ltd.), it was continuously supplied into the horizontal type polymerization reactor (manufacturer: Hitachi Ltd., kind of apparatus: spectacle-shaped blade polymerization machine, capacity: 34 L, holding capacity: 13 L). A vacuum degree of the horizontal type polymerization reactor at this time was 1 torr (0.13 kPa) or lower, and a detention time in the reaction vessel was 30 minutes. The obtained resin had Mw=55,000.

The removed distillate was cooled by the condenser and recovered. The recovered distillate was measured by gas chromatography and as a result, it was a mixture comprising phenol, a cyclic carbonate (5-butyl-5-ethyl-1,3-dioxan-2-one; BEPO), 2-ethyl-2-butyl-propane-1,3-diol, DPC and a compound which was thought to be an oligomer.

Incidentally, the measurement conditions of the gas chromatography are as follows.

Measurement apparatus: manufactured by Shimadzu Corporation; Trade name: "GC2014"
Column: GL Sciences Inc. TC-17 (df=0.25 μm, 0.25 mm I.D.×30 m)
Carrier gas: He, flow amount: 81.9 ml/min (linear velocity: 1.53 ml/min, Sprit ratio: 50)
Detector: FID
Column temperature: 70° C. (5 min)-12° C./min (10 min)-190° C. (15 min)
INJ temperature: 200° C.
DET temperature: 250° C.

The composition of the distillate is as follows. The composition of the distillate is also shown hereinbelow Table 1. Incidentally, in Table 1, the distillate was shown as "polymerization distillate".

Phenol=29 wt %
Cyclic carbonate (5-butyl-5-ethyl-1,3-dioxan-2-one)=20 wt %
2-Ethyl-2-butyl-propane-1,3-diol=25%
DPC=20 wt %
Others=6 wt %

Into 300 ml of a round bottom flask equipped with a cooling condenser and a stirring blade was charged 178 g of the distillate, and 178 g of 1 mol/L aqueous sodium hydrogen carbonate solution was added thereto. The alkali hydrolysis reaction was carried out under reflux for 2 hours. After completion of the reaction, when the oil layer was separated by a separatory funnel, it was 157 g.

The oil layer was measured by gas chromatography and the results are shown as follows. The composition of the oil layer is also shown hereinbelow Table 1.

Phenol=40 wt %
2-Ethyl-2-butyl-propane-1,3-diol=41 wt %
Others=19 wt %

The conversion ratio of the cyclic carbonate (5-butyl-5-ethyl-1,3-dioxan-2-one) to 2-ethyl-2-butyl-propane-1,3-diol was 100%. DPC was also converted into phenol by the hydrolysis, and the conversion ratio thereof was 100%.

Further, the oil layer solution was charged into 300 ml of a round bottom flask equipped with 25 cm of a Vigreux type condenser and a stirring blade, and distillation and purification was carried out. Water was mainly recovered at an overhead temperature of 83 to 65° C./430 to 200 torr, phenol was mainly recovered as Fraction 1 (f-1) at an overhead temperature of 130 to 147° C./200 torr to 130 torr, and further 2-ethyl-2-butyl-propane-1,3-diol was mainly recovered as Fraction 2 (f-2) at an overhead temperature of 150 to 190° C./90 torr to 20 torr. A purity of the recovered phenol was substantially 100%, and a purity of the 2-ethyl-2-butyl-propane-1,3-diol was 91% (f-2). The compositions of each fraction are shown in Table 1.

The total recovery ratio of the 2-ethyl-2-butyl-propane-1,3-diol from starting the distillation to the completion of the purification step was 69%.

The 2-ethyl-2-butyl-propane-1,3-diol recovered and purified was a material which can be used again as the aliphatic diol which is a linking agent.

TABLE 1

|  |  | Total weight | Formula weight | | | | Others |
|---|---|---|---|---|---|---|---|
|  |  |  | BEPO 186 | BEPG 160 | Phenol 94 | DPC 214 | — |
| Polymerization distillate | Composition (%) of distillate obtained by polymerization reaction |  | 20 | 25 | 29 | 20 | 6 |
|  | Composition (g) of polymerization distillate used in hydrolysis | 178 | 36 | 45 | 52 | 36 | 11 |
|  | Composition (mol) of polymerization distillate used in hydrolysis | 1.2 | 0.2 | 0.3 | 0.5 | 0.2 | — |
| Hydrolysis step | Composition (%) of oil layer after hydrolysis |  | 0 | 41 | 40 | 0 | 19 |
|  | Composition (g) of oil layer after hydrolysis | 157 | 0 | 64 | 63 | 0 | 30 |
|  | Composition (mol) of oil layer after hydrolysis | 1.1 | 0.0 | 0.4 | 0.7 | 0.0 | — |
|  | Conversion ratio (%) from BEPO to BEPG |  |  |  | 100 |  |  |
| Purification step | Composition (%) of purified solution f-1 |  | 0 | 5 | 69 | 0 | 26 |
|  | Composition (g) of purified solution f-1 | 94 | 0 | 5 | 65 | 0 | 24 |
|  | Composition (mol) of purified solution f-1 | 0.7 | 0.0 | 0.03 | 0.7 | 0.0 | — |
|  | Composition (%) of purified solution f-2 |  | 0 | 91 | 1 | 0 | 8 |
|  | Composition (g) of f-2 after purification | 52 | 0 | 47 | 1 | 0 | 4 |
|  | Composition (mol) of f-2 after purification | 0.3 | 0.0 | 0.3 | 0.01 | 0.0 | — |
|  | Recovered ratio (%) of total BEPG |  |  |  | 69 |  |  |

Example 2

According to a continuous preparation apparatus having two primary starting materials preparation tanks, two linking agent preparation tanks, two vertical type stirring reactors and one horizontal type stirring reactor, a polycarbonate resin was prepared by the following method.

Into the first vertical type stirring polymerization tank (Maxblend® stirring blade polymerization tank manufactured by Sumitomo Heavy Industries, Ltd., capacity; 750 L) were charged 127.904 kg of diphenylcarbonate and 117.504 kg of BPA so that a molar ratio of the starting materials (diphenylcarbonate (DPC)/bisphenol A (BPA)) became 1.16. Further, 0.1 w/v % of an aqueous cesium carbonate ($Cs_2CO_3$) solution was added to the mixture with an amount that the added amount of cesium carbonate became 0.5 μmol based on 1 mol of BPA. After replacing the atmosphere with nitrogen, the starting materials was melted at 160° C., and then, transesterification was carried out at a vacuum degree of 100 torr (13 kPa), at a heating medium temperature of 215° C. and a stirring rate of 150 rpm for 2 hours and 10 minutes while removing the forming phenol. The formed phenol was cooled by the condenser and recovered, and then, used as one of the components of the starting materials of DPC.

The polymerization reaction solution obtained in the first vertical type stirring reactor was supplied into the second vertical type stirring reactor (Double helical stirring blade polymerization tank manufactured by Sumitomo Heavy Industries, Ltd., capacity: 500 L) through a transport pipe. Transesterification was further carried out at a vacuum degree of 15 torr (2 kPa), at a heating medium temperature of 240° C. and a stirring rate of 40 rpm for 1 hour while removing the forming phenol. Subsequently, transesterification was carried out at a vacuum degree of 1 torr (0.13 kPa) or lower, at a heating medium temperature of 275° C. and a stirring rate of 20 rpm for 2 hours and 45 minutes while removing the forming phenol.

The formed phenol was cooled by the condenser and recovered, and then, used as one of the components of the starting materials of DPC.

A weight average molecular weight (Mw) of the obtained prepolymer (PP) calculated on polystyrene was 27,000, a terminal phenyl group concentration was 5.3 mol % and a terminal hydroxy group concentration was 200 ppm.

To 23.5 kg/hr of the prepolymer obtained by the step was added melted 2-ethyl-2-butyl-propane-1,3-diol (BEPG) with 245 g/hr, and after mixing with a kneader (SIKRC reactor manufactured by Kurimoto Ltd.), it was continuously supplied into the horizontal type polymerization reactor (manufacturer: Hitachi Ltd., kind of apparatus; spectacle-shaped blade polymerization machine, capacity: 34 L, holding capacity: 13 L). A vacuum degree of the horizontal type polymerization reactor at this time was 1 torr (0.13 kPa) or lower, and a detention time in the reaction vessel was 30 minutes. The obtained resin had Mw=55,000.

The removed distillate was cooled by the condenser and recovered. The recovered distillate was measured by gas chromatography and as a result, it was a mixture comprising phenol, a cyclic carbonate (5-butyl-5-ethyl-1,3-dioxan-2- one; BEPO), 2-ethyl-2-butyl-propane-1,3-diol, DPC and a compound thought to be an oligomer.

The composition of the distillate is as follows. The composition of the distillate is also shown hereinbelow Table 2. Incidentally, in Table 2, the distillate was shown as "polymerization distillate".
Phenol=29.0 wt %
Cyclic carbonate (5-butyl-5-ethyl-1,3-dioxan-2-one)= 20.0 wt %
2-Ethyl-2-butyl-propane-1,3-diol=25.0%
DPC=20.0 wt %
Others=6.0 wt %

Into 300 ml of a round bottom flask equipped with a cooling condenser and a stirring blade was charged 178 g of the distillate, and 178 g of 1 mol/L aqueous sodium hydrogen carbonate solution was added thereto. The alkali hydrolysis reaction was carried out under reflux for 2 hours. After completion of the reaction, when the oil layer was separated by a separatory funnel, it was 157 g.

The oil layer was analyzed by gas chromatography and Karl Fischer Moisture Titrator, and the results are shown as follows. The composition of the oil layer is also shown hereinbelow Table 2.
Phenol=40 wt %
2-Ethyl-2-butyl-propane-1,3-diol=41 wt %
Water=18 wt %
Others=1 wt %

The water content in the oil layer was measured by using Karl Fischer Moisture Titrator. Details of the measurement method are as follows.
Measurement apparatus: manufactured by Kyoto Electronics Manufacturing, Co., Ltd.,
Trade name: "Karl Fischer Moisture Titrator MKC-610"
Anode solution: Coulometric method Karl Fischer Reagent (Anode solution for ketones)
manufactured by Mitsubishi Chemical Corporation, AQUAMICRON® AKX
Cathode solution: Coulometric method water content measurement reagent
manufactured by Mitsubishi Chemical Corporation, AQUAMICRON® CXU
Sample weight: about 0.1 g
Measurement temperature: 25° C.

The conversion ratio of the cyclic carbonate (5-butyl-5-ethyl-1,3-dioxan-2-one) to 2-ethyl-2-butyl-propane-1,3-diol was 100%. DPC was also converted into phenol by the hydrolysis, and the conversion ratio thereof was 100%.

Further, the oil layer solution was charged into 300 ml of a round bottom flask equipped with 25 cm of a Vigreux type condenser and a stirring blade, and distillation and purification was carried out. Water was mainly recovered at an overhead temperature of 83 to 65° C./430 to 200 torr, phenol was mainly recovered as Fraction 1 (f-1) at an overhead temperature of 130 to 147° C./200 torr to 130 torr, and further 2-ethyl-2-butyl-propane-1,3-diol was mainly recovered as Fraction 2 (f-2) at an overhead temperature of 150 to 190° C./90 torr to 20 torr. A purity of the recovered phenol was substantially 100%, and a purity of the 2-ethyl-2-butyl-propane-1,3-diol was 91% (f-2). The compositions of each fraction are shown in Table 2.

The total recovery ratio of the 2-ethyl-2-butyl-propane-1,3-diol from starting the distillation to the completion of the purification step was 69%.

The 2-ethyl-2-butyl-propane-1,3-diol recovered and purified was a material which can be used again as the aliphatic diol which is a linking agent.

TABLE 2

|  |  |  | Formula weight | | | | | |
|---|---|---|---|---|---|---|---|---|
|  |  | Total weight | BEPO 186 | BEPG 160 | Phenol 94 | DPC 214 | Water 18 | Others — |
| Polymerization distillate | Composition (%) of distillate obtained by polymerization reaction |  | 20.0 | 25.0 | 29.0 | 20.0 | 0.0 | 6.0 |
|  | Composition (g) of polymerization distillate used in hydrolysis | 178 | 35.6 | 44.5 | 51.6 | 35.6 | 0.0 | 10.7 |
|  | Composition (mol) of polymerization distillate used in hydrolysis | 1.2 | 0.2 | 0.3 | 0.5 | 0.2 | 0.0 | — |
| Hydrolysis step | Composition (%) of oil layer after hydrolysis |  | 0.0 | 41.0 | 40.0 | 0.0 | 18.0 | 1.0 |
|  | Composition (g) of oil layer after hydrolysis | 157 | 0.0 | 64.4 | 62.8 | 0.0 | 28.3 | 1.6 |
|  | Composition (mol) of oil layer after hydrolysis | 1.1 | 0.0 | 0.4 | 0.7 | 0.0 | 1.6 | — |
|  | Conversion ratio (%) from BEPO to BEPG |  |  |  | 100.0 |  |  |  |
| Purification step | Composition (%) of purified solution f-1 |  | 0.0 | 5.0 | 69.0 | 0.0 | 18.0 | 8.0 |
|  | Composition (g) of purified solution f-1 | 94 | 0.0 | 4.7 | 64.9 | 0.0 | 16.9 | 7.5 |
|  | Composition (mol) of purified solution f-1 | 0.7 | 0.0 | 0.03 | 0.7 | 0.0 | 0.9 | — |
|  | Composition (%) of purified solution f-2 |  | 0.0 | 91.0 | 1.0 | 0.0 | 0.0 | 8.0 |
|  | Composition (g) of f-2 after purification | 52 | 0.0 | 47.3 | 0.5 | 0.0 | 0.0 | 4.2 |
|  | Composition (mol) of f-2 after purification | 0.3 | 0.0 | 0.3 | 0.01 | 0.0 | 0.0 | — |

TABLE 2-continued

|  | Formula weight | | | | | |
| --- | --- | --- | --- | --- | --- | --- |
|  | Total weight | BEPO 186 | BEPG 160 | Phenol 94 | DPC 214 | Water 18 | Others — |
| Recovered ratio (%) of total BEPG |  |  |  | 69 |  |  |  |

Example 3

According to a continuous preparation apparatus having two primary starting material preparation tanks, two linking agent preparation tanks, two vertical type stirring reactors and one horizontal type stirring reactor, a polycarbonate resin was prepared by the following method.

Into the first vertical type stirring polymerization tank (Maxblend® stirring blade polymerization tank manufactured by Sumitomo Heavy Industries, Ltd., capacity: 750 L) were charged 127.904 kg of diphenylcarbonate and 117.504 kg of BPA so that a molar ratio of the starting materials (diphenylcarbonate (DPC)/bisphenol A (BPA)) became 1.16. Further, 0.1 w/v % of an aqueous cesium carbonate ($Cs_2CO_3$) solution was added to the mixture with an amount that the added amount of cesium carbonate became 0.5 µmol based on 1 mol of BPA. After replacing the atmosphere with nitrogen, the starting materials was melted at 160° C., and then, transesterification was carried out at a vacuum degree of 100 tort (13 kPa), at a heating medium temperature of 215° C. and a stirring rate of 150 rpm for 1 hours and 50 minutes while removing the forming phenol. The formed phenol was cooled by the condenser and recovered, and then, used as one of the components of the starting materials of DPC.

The polymerization reaction solution obtained in the first vertical type stirring reactor was supplied into the second vertical type stirring reactor (Double helical stirring blade polymerization tank manufactured by Sumitomo Heavy Industries, Ltd., capacity: 500 L) through a transport pipe.

Transesterification was further carried out at a vacuum degree of 15 torr (2 kPa), at a heating medium temperature of 240° C. and a stirring rate of 40 rpm for 1 hour and 15 minutes while removing the forming phenol. Subsequently, transesterification was carried out at a vacuum degree of 1 torr (0.13 kPa) or lower, at a heating medium temperature of 275° C. and a stirring rate of 20 rpm for 2 hours and 15 minutes while removing the forming phenol.

The formed phenol was cooled by the condenser and recovered, and then, used as one of the components of the starting materials of DPC.

A weight average molecular weight (Mw) of the obtained prepolymer (PP) calculated on polystyrene was 24,000, a terminal phenyl group concentration was 5.3 mol % and a terminal hydroxy group concentration was 350 ppm.

To 23.5 kg/hr of the prepolymer obtained by the step was added melted 2-ethyl-2-butyl-propane-1,3-diol (BEPG) with 488 g/hr, and after mixing with a kneader (SIKRC reactor manufactured by Kurimoto Ltd.), it was continuously supplied into the horizontal type polymerization reactor (manufacturer: Hitachi Ltd., kind of apparatus; spectacle-shaped blade polymerization machine, capacity: 34 L, holding capacity: 13 L). A vacuum degree of the horizontal type polymerization reactor at this time was 1 torr (0.13 kPa) or lower, and a detention time in the reaction vessel was 30 minutes. The obtained resin had Mw=54,000.

The removed distillate was cooled by the condenser and recovered. The recovered distillate was measured by gas chromatography and as a result, it was a mixture comprising phenol, a cyclic carbonate (5-butyl-5-ethyl-1,3-dioxan-2-one; BEPO), 2-ethyl-2-butyl-propane-1,3-diol, DPC and a compound thought to be an oligomer.

The composition of the distillate is as follows. The composition of the distillate is also shown hereinbelow Table 3. Incidentally, in Table 3, the distillate was shown as "polymerization distillate".

Phenol=20.6 wt %
Cyclic carbonate (5-butyl-5-ethyl-1,3-dioxan-2-one)= 25.8 wt %
2-Ethyl-2-butyl-propane-1,3-diol=37.5%
DPC=15.3 wt %
Others=0.8 wt %

Into 3,000 ml of a heating jacket-attached separable flask equipped with a cooling condenser, a stirring blade and a flush valve at the bottom of the flask was charged 1,004.1 g of the distillate, and 199.75 g of a 20 wt % aqueous sodium hydroxide solution and 101.72 g of water were added thereto. The alkali hydrolysis reaction was carried out under reflux for 1 hour. After completion of the reaction, 244.28 g of a 20 wt % aqueous sulfuric acid solution was added to the mixture, and the mixture was stirred and the aqueous layer was confirmed to be acidic. Subsequently, 446.9 g of benzene (an added amount which is 22.4 wt % based on the total liquid weight containing the hydrolysate solution and benzene) was added to the mixture and the mixture was stirred. In the liquids separating operation thereafter, it was carried out by making the solution temperature about 50° C. The aqueous layer was drained from the flush valve at the bottom of the flask, and 400 g of water was added to the mixture and the mixture was stirred. The aqueous layer was again drained from the flush valve at the bottom of the flask, and 400 g of water was added to the mixture and the mixture was stirred. The aqueous layer was drained from the flush valve at the bottom to obtain 1453.5 g of the oil layer after the hydrolysis reaction.

The oil layer was analyzed by gas chromatography and Karl Fischer Moisture Titrator, and the results are shown as follows. The composition of the oil layer is also shown hereinbelow Table 3. Incidentally, the oil layer after hydrolysis in Table 3 means the oil layer after the washing treatment with water.

Phenol=19.6 wt %
Cyclic carbonate (5-butyl-5-ethyl-1,3-dioxan-2-one)=0.0 wt %
2-Ethyl-2-butyl-propane-1,3-diol=36.4%
DPC=0.0 wt %
Water=4.7 wt %
Benzene and others=39.3 wt %

After completion of the reaction, a 20 wt % aqueous sulfuric acid solution was added to thereto to make the aqueous layer acidic, the solution temperature was raised to about 50° C., and benzene was added thereto to cause the difference in specific gravity between oil and water, whereby separability between oil and water could be improved.

The conversion ratio of the cyclic carbonate (5-butyl-5-ethyl-1,3-dioxan-2-one) to 2-ethyl-2-butyl-propane-1,3-diol was 100%. DPC was also converted into phenol by the hydrolysis, and the conversion ratio thereof was 100%.

Phenol=29.2 wt %
Cyclic carbonate (5-butyl-5-ethyl-1,3-dioxan-2-one)=0.0 wt %
2-Ethyl-2-butyl-propane-1,3-diol=53.0 wt %
DPC=0.0 wt %
Water=10.2 wt %
Others=7.5 wt %

After completion of the reaction, a 20 wt % aqueous sulfuric acid solution was added to thereto to make the aqueous layer acidic, and the solution temperature was

TABLE 3

|  |  | Total weight | Formula weight | | | | | | |
|---|---|---|---|---|---|---|---|---|---|
|  |  |  | BEPO 186 | BEPG 160 | Phenol 94 | DPC 214 | Water 18 | Benzene 78 | Others — |
| Polymerization distillate | Composition (%) of distillate obtained by polymerization reaction |  | 25.8 | 37.5 | 20.6 | 15.3 | 0.0 | — | 0.8 |
|  | Composition (g) of polymerization distillate used in hydrolysis | 1004.1 | 259.1 | 376.3 | 207.0 | 153.5 | 0.0 | — | 8.2 |
|  | Composition (mol) of polymerization distillate used in hydrolysis | 6.655 | 1.391 | 2.348 | 2.199 | 0.717 | 0.000 | — | — |
| Hydrolysis step | Composition (%) of oil layer after hydrolysis |  | 0.0 | 36.4 | 19.6 | 0.0 | 4.7 | 30.7 | 8.6 |
|  | Composition (g) of oil layer after hydrolysis | 1453.5 | 0.0 | 529.1 | 2842 | 0.0 | 68.3 | 446.9 | 125.0 |
|  | Composition (mol) of oil layer after hydrolysis | 6.3 | 0.0 | 3.3 | 3.0 | 0.0 | 3.8 | 6.8 | — |
|  | Conversion ratio (%) from BEPO to BEPG |  |  |  |  | 100 |  |  |  |

Example 4

An aromatic polycarbonate resin was prepared in the same manner as in Example 3 except for changing the recycle step in Example 3 as follows.

Into 3,000 ml of a heating jacket-attached separable flask equipped with a cooling condenser, a stirring blade and a flush valve at the bottom of the flask was charged 1,008.8 g of the distillate, and 200.66 g of a 20 wt % aqueous sodium hydroxide solution was added thereto. The alkali hydrolysis reaction was carried out under reflux for 1 hour. After completion of the reaction, 235.63 g of a 20 wt % aqueous sulfuric acid solution was added to the mixture, and the mixture was stirred and the aqueous layer was confirmed to be acidic. In the liquids separating operation thereafter, it was carried out by making the solution temperature about 50° C. The aqueous layer was drained from the flush valve at the bottom of the flask, and 400 g of a 10 wt % aqueous sodium sulfate solution was added to the mixture and the mixture was stirred. The aqueous layer was again drained from the flush valve at the bottom of the flask, and 400 g of a 10 wt % aqueous sodium sulfate solution was added to the mixture and the mixture was stirred. The aqueous layer was drained from the flush valve at the bottom to obtain 1039.9 g of the oil layer after the hydrolysis reaction.

The oil layer was analyzed by gas chromatography and Karl Fischer Moisture Titrator, and the results are shown as follows. The composition of the oil layer is also shown hereinbelow Table 4. Incidentally, the oil layer after hydrolysis in Table 4 means the oil layer after the washing treatment with a 10 wt % aqueous sodium sulfate solution.

raised to about 50° C., separability between oil and water could be improved. Further, by washing the oil layer with an aqueous sodium sulfate solution, separability between oil and water could be improved.

The conversion ratio of the cyclic carbonate (5-butyl-5-ethyl-1,3-dioxan-2-one) to 2-ethyl-2-butyl-propane-1,3-diol was 100%. DPC was also converted into phenol by the hydrolysis, and the conversion ratio thereof was 100%.

Moreover, 1027.7 g of the oil layer solution was subjected to distillation and purification under reduced pressure by Sulzer Laboratory packing packed tower still distillation apparatus. Water was mainly recovered (f-1 and f-2) at an overhead temperature of 44 to 89° C./210 to 20 torr. Phenol was mainly recovered (f-3 to f-5) at an overhead temperature of 90 to 96° C./25 torr to 20 torr, and further 2-ethyl-2-butyl-propane-1,3-diol was mainly recovered (f-8 to f-9) at an overhead temperature of 100 to 94° C./0.5 torr to 0.1 torr. Fractions f-6 and f-7 were fractions in which the main distillate was changing from phenol to 2-ethyl-2-butyl-propane-1,3-diol. A phenol purity recovered at f-3 to f-5 was substantially 100% (a water content was less than 1%), and a 2-ethyl-2-butyl-propane-1,3-diol purity recovered at f-7 to f-9 was substantially 100% (phenol and a water content were less than 1%). Composition of each fraction is shown in Table 4.

The total recovery ratio of the 2-ethyl-2-butyl-propane-1,3-diol from starting the distillation to the completion of the purification step was 85%.

The 2-ethyl-2-butyl-propane-1,3-diol recovered and purified was a material which an be used again a the aliphatic diol which is a linking agent.

TABLE 4

|  |  | Total weight | Formula weight | | | | | |
|---|---|---|---|---|---|---|---|---|
|  |  |  | BEPO 186 | BEPG 160 | Phenol 94 | DPC 214 | Water 18 | Others — |
| Polymerization distillate | Composition (%) of distillate obtained by polymerization reaction |  | 25.6 | 37.2 | 20.5 | 15.2 | 0.0 | 1.6 |
|  | Composition (g) of polymerization distillate used in hydrolysis | 1008.8 | 258.2 | 375.1 | 206.3 | 153.0 | 0.0 | 16.2 |
|  | Composition (mol) of polymerization distillate used in hydrolysis | 6.633 | 1.4 | 2.3 | 2.2 | 0.7 | 0.0 | — |
| Hydrolysis step | Composition (%) of oil layer after hydrolysis |  | 0.0 | 53.0 | 29.2 | 0.0 | 10.2 | 7.5 |
|  | Composition (g) of oil layer after hydrolysis | 1039.9 | 0.0 | 551.3 | 304.1 | 0.0 | 106.1 | 78.4 |
|  | Composition (mol) of oil layer after hydrolysis | 6.7 | 0.0 | 3.4 | 3.2 | 0.0 | 5.9 | — |
|  | Conversion ratio (%) from BEPO to BEPG |  |  |  | 100.0 |  |  |  |
| Purification step | Composition (%) of purified solution f-1 |  | 0.0 | 0.0 | 5.8 | 0.0 | 94.1 | 0.1 |
|  | Composition (g) of purified solution f-1 | 77.7 | 0.0 | 0.0 | 4.5 | 0.0 | 73.1 | 0.1 |
|  | Composition (mol) of purified solution f-1 | 4.1 | 0.0 | 0.00 | 0.0 | 0.0 | 4.1 | — |
|  | Composition (%) of purified solution f-2 |  | 0.0 | 0.0 | 11.2 | 0.0 | 88.8 | 0.0 |
|  | Composition (g) of purified solution f-2 | 29.4 | 0.0 | 0.0 | 3.3 | 0.0 | 26.1 | 0.0 |
|  | Composition (mol) of purified solution f-2 | 1.5 | 0.0 | 0.0 | 0.04 | 0.0 | 1.5 | — |
|  | Composition (%) of purified solution f-3 |  | 0.0 | 0.0 | 96.5 | 0.0 | 0.7 | 2.8 |
|  | Composition (g) of purified solution f-3 | 93.7 | 0.0 | 0.0 | 90.4 | 0.0 | 0.7 | 2.6 |
|  | Composition (mol) of purified solution f-3 | 1 | 0.0 | 0.0 | 0.96 | 0.0 | 0.0 | — |
|  | Composition (%) of purified solution f-4 |  | 0.0 | 0.0 | 97.3 | 0.0 | 0.4 | 2.3 |
|  | Composition (g) of purified solution f-4 | 107.3 | 0.0 | 0.0 | 104.4 | 0.0 | 0.4 | 2.5 |
|  | Composition (mol) of purified solution f-4 | 1.1 | 0.0 | 0.0 | 1.10 | 0.0 | 0.0 | — |
|  | Composition (%) of purified solution f-5 |  | 0.0 | 0.0 | 96.0 | 0.0 | 0.8 | 3.2 |
|  | Composition (g) of purified solution f-5 | 47.1 | 0.0 | 0.0 | 45.2 | 0.0 | 0.4 | 1.5 |
|  | Composition (mol) of purified solution f-5 | 0.5 | 0.0 | 0.00 | 0.5 | 0.0 | 0.0 | — |
|  | Composition (%) of purified solution f-6 |  | 0.0 | 19.1 | 79.5 | 0.0 | 0.2 | 1.3 |
|  | Composition (g) of purified solution f-6 | 82.8 | 0.0 | 15.8 | 65.8 | 0.0 | 0.2 | 1.1 |
|  | Composition (mol) of purified solution f-6 | 0.8 | 0.0 | 0.1 | 0.70 | 0.0 | 0.0 | — |
|  | Composition (%) of purified solution f-7 |  | 0.0 | 94.4 | 4.5 | 0.0 | 0.1 | 1.1 |
|  | Composition (g) of purified solution f-7 | 33.7 | 0.0 | 31.8 | 1.5 | 0.0 | 0.0 | 0.4 |
|  | Composition (mol) of purified solution f-7 | 0.2 | 0.0 | 0.2 | 0.00 | 0.0 | 0.0 | — |
|  | Composition (%) of purified solution f-8 |  | 0.0 | 99.1 | 0.0 | 0.0 | 0.0 | 0.9 |
|  | Composition (g) of purified solution f-8 | 377.8 | 0.0 | 374.4 | 0.0 | 0.0 | 0.1 | 3.3 |
|  | Composition (mol) of purified solution f-8 | 2.3 | 0.0 | 2.3 | 0.00 | 0.0 | 0.0 | — |
|  | Composition (%) of purified solution f-9 |  | 0.0 | 97.9 | 0.0 | 0.0 | 0.0 | 2.1 |
|  | Composition (g) of purified solution f-9 | 88.8 | 0.0 | 86.9 | 0.0 | 0.0 | 0.0 | 1.9 |
|  | Composition (mol) of purified solution f-9 | 0.5 | 0.0 | 0.5 | 0.00 | 0.0 | 0.0 | — |

TABLE 4-continued

| | Total weight | BEPO 186 | BEPG 160 | Phenol 94 | DPC 214 | Water 18 | Others — |
|---|---|---|---|---|---|---|---|
| | | | Formula weight | | | | |
| Still residue (g) | 29.5 | | | | | | |
| Weight of substance (g) condensed in trap | 7.6 | | | | | | |
| Weight of substance (g) remained in distillation column | 52.3 | | | | | | |
| Recovered ratio (%) of total BEPG | | | | 85 | | | |

The whole disclosure of Japanese Patent Application No. 2012-252797 is incorporated in the present specification by reference.

All the documents, patent applications, and technical standards described in the present specification are incorporated in the present specification by reference with the same extent that each document, patent application and technical standard is described to be incorporated by reference.

INDUSTRIAL APPLICABILITY

According to the process of the present invention, by using an aliphatic diol compound as a linking agent, in the preparation process of a high molecular weight polycarbonate resin which links and highly polymerize an aromatic polycarbonate prepolymer, the linking agent can be recovered and reused (recycled) so that the linking agent can be continuously used without substantially consuming the same.

In the higher polymerization method using a linking agent, there is a merit that a resin product having equivalent or more qualities to that of the interfacial polymerization method while using the melt polymerization method having many industrial merits as compared with those of the interfacial polymerization method, and according to the present invention, in addition to the above, the consuming starting materials are the aromatic dihydroxy compound and the carbonate diester alone, so that there is a great merit in the point of the cost for the starting materials.

The invention claimed is:

1. A process for preparing a highly polymerized aromatic polycarbonate resin, which comprises:
highly polymerizing an aromatic polycarbonate prepolymer and an aliphatic diol compound represented by the following formula (g2), the highly polymerizing including reacting the aromatic polycarbonate prepolymer and the aliphatic diol compound in the presence of a transesterification catalyst to obtain a highly polymerized aromatic polycarbonate resin;
removing at least part of cyclic carbonate by-product produced in the highly polymerizing to obtain removed cyclic carbonate, the removing including removing a distillate containing at least a part of the cyclic carbonate formed in the highly polymerizing; and
hydrolyzing the removed cyclic carbonate to obtain an obtained aliphatic diol compound and recycling the obtained aliphatic diol compound as at least a part of the aliphatic diol compound in the highly polymerizing:

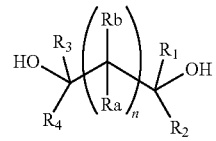

wherein, in the formula (g2), Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring; $R_1$ to $R_4$ each independently represent a hydrogen atom, a halogen atom or a linear or branched alkyl group having 1 to 5 carbon atoms; and n represents an integer of 0 to 30.

2. The process for preparing according to claim 1, wherein the hydrolyzing comprises obtaining a hydrolysate solution by subjecting the distillate to hydrolysis treatment, and purifying the hydrolysate solution to separate the obtained aliphatic diol compound.

3. The process for preparing according to claim 2, wherein the purifying comprises separating the hydrolysate solution to an aqueous layer and an oil layer containing aliphatic diol compound, and purifying the oil layer to separate the obtained aliphatic diol compound.

4. The process for preparing according to claim 3, wherein the separating the hydrolysate solution comprises adding an acid or an alkali to the hydrolysate solution.

5. The preparation process according to claim 3, wherein the separating the hydrolysate solution comprises adding an organic solvent to the hydrolysate solution.

6. The process for preparing according to claim 3, wherein the separating the hydrolysate solution comprises heating the hydrolysate solution.

7. The process for preparing according to claim 2, wherein the hydrolysis treatment is carried out by using 0.1 to 1.5-fold weight of alkali water based on an amount of the distillate.

8. The process for preparing according to claim 1, wherein the aliphatic diol compound is an aliphatic diol compound represented by the following formula (g3):

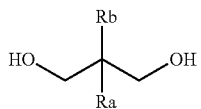

(g3)

wherein, in the formula (g3), Ra and Rb each independently represent a hydrogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, and Ra and Rb may be bonded to each other to form a ring.

9. The process for preparing according to claim 8, wherein the aliphatic diol compound is selected from the group consisting of 2-butyl-2-ethylpropane-1,3-diol, 2,2-diisobutylpropane-1,3-diol, 2-ethyl-2-methylpropane-1,3-diol, 2,2diethylpropane-1,3-diol and 2-methyl-2-propylpropane-1,3-diol.

10. The process for preparing according to claim 1, wherein the cyclic carbonate is a compound represented by the following formula (h2):

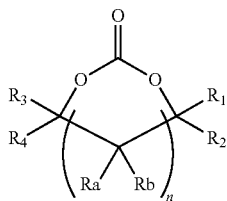

(h2)

wherein, in the formula (h2), Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring; $R_1$ to $R_4$ each independently represent a hydrogen atom, a halogen atom or a linear or branched alkyl group having 1 to 5carbon atoms; and n represents an integer of 0 to 30.

11. The process for preparing according to claim 10, wherein the cyclic carbonate is a compound represented by the following formula (h3):

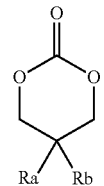

(h3)

wherein, in the formula (h3), Ra and Rb each independently represent a hydrogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring.

12. The process for preparing according to claim 1, wherein an amount of the aliphatic diol compound in the highly polymerizing is 0.01 to 1.0 mol based on 1 mol of total terminal amount of the aromatic polycarbonate prepolymer.

13. The process for preparing according to claim 1, wherein 50 to 100% by weight of the obtained aliphatic diol compound is recycled as the at least a part of the aliphatic diol compound in the highly polymerizing.

14. The process for preparing according to claim 1, wherein the hydrolyzing is an alkali hydrolysis.

15. The process for preparing according to claim 1, wherein the hydrolyzing is carried out at a temperature range of 25 to 120° C.

* * * * *